(12) United States Patent
Kirshenbaum et al.

(10) Patent No.: US 9,690,496 B2
(45) Date of Patent: *Jun. 27, 2017

(54) USING EXTERNAL MEMORY DEVICES TO IMPROVE SYSTEM PERFORMANCE

(71) Applicant: MICROSOFT TECHNOLOGY LICENSING, LLC, Redmond, WA (US)

(72) Inventors: Alexander Kirshenbaum, Bellevue, WA (US); Cenk Ergan, Redmond, WA (US); Michael R. Fortin, Redmond, WA (US); Robert L. Reinauer, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,357

(22) Filed: Mar. 24, 2016

(65) Prior Publication Data
US 2016/0210058 A1 Jul. 21, 2016

Related U.S. Application Data

(63) Continuation of application No. 14/530,661, filed on Oct. 31, 2014, now Pat. No. 9,317,209, which is a
(Continued)

(51) Int. Cl.
*G06F 3/06* (2006.01)
*G06F 12/08* (2016.01)
*G06F 12/0866* (2016.01)

(52) U.S. Cl.
CPC .......... *G06F 3/0611* (2013.01); *G06F 3/0655* (2013.01); *G06F 3/0685* (2013.01); *G06F 3/0688* (2013.01); *G06F 12/0866* (2013.01)

(58) Field of Classification Search
CPC .. G06F 12/0866; G06F 3/0611; G06F 3/0655; G06F 3/0688; G06F 11/1441;
(Continued)

(56) References Cited

U.S. PATENT DOCUMENTS 4,476,526 A 10/1984 Dodd
4,612,612 A 9/1986 Woffinden
(Continued)

FOREIGN PATENT DOCUMENTS

CN 1266229 9/2000
CN 1421003 A 5/2003
(Continued)

OTHER PUBLICATIONS

U.S. Appl. No. 10/970,772, filed Oct. 21, 2004, Kirshenbaum.
(Continued)

*Primary Examiner* — Zhuo Li
(74) *Attorney, Agent, or Firm* — L. Alan Collins; Collins & Collins Intellectual, LLC

(57) ABSTRACT

The invention is directed towards a system and method that utilizes external memory devices to cache sectors from a rotating storage device (e.g., a hard drive) to improve system performance. When an external memory device (EMD) is plugged into the computing device or onto a network in which the computing device is connected, the system recognizes the EMD and populates the EMD with disk sectors. The system routes I/O read requests directed to the disk sector to the EMD cache instead of the actual disk sector. The use of EMDs increases performance and productivity on the computing device systems for a fraction of the cost of adding memory to the computing device.

20 Claims, 4 Drawing Sheets

Related U.S. Application Data continuation of application No. 13/187,757, filed on Jul. 21, 2011, now Pat. No. 8,909,861, which is a continuation of application No. 12/775,168, filed on May 6, 2010, now Pat. No. 8,006,037, which is a continuation of application No. 12/366,112, filed on Feb. 5, 2009, now Pat. No. 7,805,571, which is a continuation of application No. 10/970,772, filed on Oct. 21, 2004, now Pat. No. 7,490,197.

(58) Field of Classification Search
CPC .. G06F 12/0246; G06F 12/0808; G06F 12/12; G06F 2212/1052; G06F 2212/2022; G06F 2212/2146; G06F 2212/222; G06F 2212/466
See application file for complete search history.

(56) References Cited

U.S. PATENT DOCUMENTS

| | | |
|---|---|---|
| 4,671,111 A | 6/1987 | Lemelson |
| 4,945,474 A | 7/1990 | Elliot et al. |
| 4,972,316 A | 11/1990 | Dixon et al. |
| 4,979,108 A | 12/1990 | Crabbe, Jr. |
| 5,088,026 A | 2/1992 | Bozman |
| 5,175,634 A | 12/1992 | Matsuzaki |
| 5,175,834 A | 12/1992 | Sawai |
| 5,263,136 A | 11/1993 | DeAguiar |
| 5,297,258 A | 3/1994 | Hale |
| 5,307,497 A | 4/1994 | Feigenbaum et al. |
| 5,394,531 A | 2/1995 | Smith |
| 5,398,325 A | 3/1995 | Chang |
| 5,420,998 A | 5/1995 | Horning |
| 5,454,098 A | 9/1995 | Pisello |
| 5,463,739 A | 10/1995 | Albaugh et al. |
| 5,524,230 A | 6/1996 | Sakaue et al. |
| 5,551,002 A | 8/1996 | Rosich |
| 5,557,770 A | 9/1996 | Bhide |
| 5,561,783 A | 10/1996 | Vanka |
| 5,572,660 A | 11/1996 | Jones |
| 5,574,877 A | 11/1996 | Dixit |
| 5,586,290 A | 12/1996 | Hirai et al. |
| 5,603,001 A | 2/1997 | Sukegawa |
| 5,611,067 A | 3/1997 | Okamoto |
| 5,636,355 A | 6/1997 | Ramakrishnan |
| 5,652,857 A | 7/1997 | Shimoi et al. |
| 5,666,532 A | 9/1997 | Saks |
| 5,668,968 A | 9/1997 | Wu |
| 5,717,954 A | 2/1998 | Grieff |
| 5,720,029 A | 2/1998 | Kern et al. |
| 5,740,434 A | 4/1998 | Eastep |
| 5,751,932 A | 5/1998 | Horst et al. |
| 5,751,990 A | 5/1998 | Krolak |
| 5,754,782 A | 5/1998 | Masada |
| 5,754,888 A | 5/1998 | Yang |
| 5,758,056 A | 5/1998 | Barr |
| 5,758,174 A | 5/1998 | Crump |
| 5,764,877 A | 6/1998 | Lomet et al. |
| 5,806,074 A | 9/1998 | Souder et al. |
| 5,809,280 A | 9/1998 | Chard |
| 5,809,543 A | 9/1998 | Byers |
| 5,832,515 A | 11/1998 | Ledain |
| 5,845,293 A | 12/1998 | Veghte |
| 5,860,083 A | 1/1999 | Sukegawa |
| 5,875,466 A | 2/1999 | Wakerly |
| 5,897,638 A | 4/1999 | Lasser et al. |
| 5,897,660 A | 4/1999 | Reinders |
| 5,900,022 A | 5/1999 | Kranich |
| 5,900,870 A | 5/1999 | Malone et al. |
| 5,923,838 A | 7/1999 | Hongo |
| 5,937,433 A | 8/1999 | Lee |
| 5,943,687 A | 8/1999 | Liedberg |
| 5,943,692 A | 8/1999 | Marberg et al. |
| 5,991,847 A | 11/1999 | Ballard |
| 5,996,054 A | 11/1999 | Ledain |
| 6,000,006 A | 12/1999 | Bruce |
| 6,018,433 A | 1/2000 | Thayne et al. |
| 6,018,746 A | 1/2000 | Hill et al. |
| 6,021,408 A | 2/2000 | Ledain |
| 6,026,027 A | 2/2000 | Terrell |
| 6,047,291 A | 4/2000 | Anderson et al. |
| 6,073,232 A | 6/2000 | Kroeker et al. |
| 6,092,160 A | 7/2000 | Marsters |
| 6,098,075 A | 8/2000 | Becraft, Jr. et al. |
| 6,101,601 A | 8/2000 | Matthews et al. |
| 6,108,004 A | 8/2000 | Medl |
| 6,112,024 A | 8/2000 | Almond et al. |
| 6,122,685 A | 9/2000 | Bachmat |
| 6,128,627 A | 10/2000 | Mattis |
| 6,138,125 A | 10/2000 | DeMoss |
| 6,148,368 A | 11/2000 | DeKoning |
| 6,185,629 B1 | 2/2001 | Simpson |
| 6,189,071 B1 | 2/2001 | Bachmat |
| 6,199,195 B1 | 3/2001 | Goodwin et al. |
| 6,209,088 B1 | 3/2001 | Reneris |
| 6,230,233 B1 | 5/2001 | Lofgren |
| 6,237,065 B1 | 5/2001 | Banerjia |
| 6,240,414 B1 | 5/2001 | Beizer et al. |
| 6,247,026 B1 | 6/2001 | Waldo et al. |
| 6,249,841 B1 | 6/2001 | Sikes |
| 6,272,534 B1 | 8/2001 | Guha |
| 6,275,436 B1 | 8/2001 | Tobita |
| 6,298,428 B1 | 10/2001 | Munroe |
| 6,301,635 B2 | 10/2001 | Bothwell |
| 6,311,232 B1 | 10/2001 | Cagle et al. |
| 6,314,433 B1 | 11/2001 | Mills et al. |
| 6,317,806 B1 | 11/2001 | Audityan |
| 6,321,234 B1 | 11/2001 | Debrunner |
| 6,338,056 B1 | 1/2002 | Dessloch et al. |
| 6,338,126 B1 | 1/2002 | Ohran et al. |
| 6,345,000 B1 | 2/2002 | Wong |
| 6,360,330 B1 | 3/2002 | Mutalik et al. |
| 6,366,996 B1 | 4/2002 | Hobson |
| 6,370,534 B1 | 4/2002 | Odom et al. |
| 6,370,541 B1 | 4/2002 | Chou et al. |
| 6,378,043 B1 | 4/2002 | Girkar |
| 6,401,093 B1 | 6/2002 | Anand et al. |
| 6,408,058 B1 | 6/2002 | Lanet |
| 6,418,510 B1 | 7/2002 | Lamberts |
| 6,425,057 B1 | 7/2002 | Cherkasova |
| 6,434,682 B1 | 8/2002 | Ashton et al. |
| 6,438,750 B1 | 8/2002 | Anderson |
| 6,454,159 B1 | 9/2002 | Takushima |
| 6,477,564 B1 | 11/2002 | Freyssinet et al. |
| 6,505,205 B1 | 1/2003 | Kothuri et al. |
| 6,513,051 B1 | 1/2003 | Bolosky |
| 6,516,380 B2 | 2/2003 | Kenchammana-Hoskote |
| 6,519,597 B1 | 2/2003 | Cheng et al. |
| 6,535,949 B1 | 3/2003 | Parker |
| 6,539,456 B2 | 3/2003 | Stewart |
| 6,542,904 B2 | 4/2003 | Crus et al. |
| 6,546,472 B2 | 4/2003 | Atkinson |
| 6,556,983 B1 | 4/2003 | Altschuler et al. |
| 6,557,077 B1 | 4/2003 | Ghosh |
| 6,560,702 B1 | 5/2003 | Gharda et al. |
| 6,567,889 B1 | 5/2003 | Dekoning et al. |
| 6,578,046 B2 | 6/2003 | Chang et al. |
| 6,609,182 B1 | 8/2003 | Pedrizetti |
| 6,611,919 B1 | 8/2003 | Matsuya |
| 6,615,313 B2 | 9/2003 | Kato et al. |
| 6,625,742 B1 | 9/2003 | Owhadi |
| 6,629,201 B2 | 9/2003 | Dempsey |
| 6,636,942 B2 | 10/2003 | Greco |
| 6,640,278 B1 | 10/2003 | Nolan et al. |
| 6,647,472 B2 | 11/2003 | Atkinson et al. |
| 6,651,141 B2 | 11/2003 | Adrangi |
| 6,671,699 B1 | 12/2003 | Black et al. |
| 6,671,757 B1 | 12/2003 | Multer et al. |
| 6,684,229 B1 | 1/2004 | Luong et al. |
| 6,687,158 B2 | 2/2004 | Yano |
| 6,694,336 B1 | 2/2004 | Multer et al. |
| 6,714,935 B1 | 3/2004 | Delo |
| 6,718,361 B1 | 4/2004 | Basani et al. |
| 6,721,863 B1 | 4/2004 | Endo |

(56) References Cited

U.S. PATENT DOCUMENTS

| | | |
|---|---|---|
| 6,738,789 B2 | 5/2004 | Multer et al. |
| 6,742,097 B2 | 5/2004 | Woo |
| 6,751,658 B1 | 6/2004 | Haun et al. |
| 6,757,696 B2 | 6/2004 | Multer et al. |
| 6,760,736 B2 | 7/2004 | Waldo et al. |
| 6,769,050 B1 | 7/2004 | Ware |
| 6,771,536 B2 | 8/2004 | Li |
| 6,772,178 B2 | 8/2004 | Mandal et al. |
| 6,782,453 B2 | 8/2004 | Keltcher |
| 6,788,612 B2 | 9/2004 | Hsu |
| 6,871,271 B2 | 3/2005 | Ohran et al. |
| 6,877,081 B2 | 4/2005 | Herger |
| 6,879,266 B1 | 4/2005 | Dye |
| 6,901,499 B2 | 5/2005 | Aasheim |
| 6,910,106 B2 | 6/2005 | Sechrest |
| 6,918,022 B2 | 7/2005 | Li |
| 6,920,533 B2 | 7/2005 | Coulson |
| 6,928,521 B1 | 8/2005 | Burton |
| 6,930,919 B2 | 8/2005 | Lee |
| 6,938,116 B2 | 8/2005 | Kim |
| 6,941,423 B2 | 9/2005 | Coulson |
| 6,959,318 B1 | 10/2005 | Tso |
| 6,968,450 B1 | 11/2005 | Rothberg |
| 6,996,660 B1 | 2/2006 | Moore |
| 7,007,072 B1 | 2/2006 | Guha |
| 7,010,645 B2 | 3/2006 | Hetzler |
| 7,017,037 B2 | 3/2006 | Fortin et al. |
| 7,036,040 B2 | 4/2006 | Nicholson et al. |
| 7,039,765 B1 | 5/2006 | Wilkes |
| 7,043,610 B2 | 5/2006 | Horn |
| 7,057,942 B2 | 6/2006 | Suda |
| 7,062,675 B1 | 6/2006 | Kemeny |
| 7,065,627 B2 | 6/2006 | Dayan et al. |
| 7,068,575 B2 | 6/2006 | Gabryjelski |
| 7,082,495 B2 | 7/2006 | DeWhitt |
| 7,082,499 B2 | 7/2006 | Kamitani |
| 7,143,120 B2 | 11/2006 | Oks et al. |
| 7,171,532 B2 | 1/2007 | Kodama |
| 7,185,155 B2 | 2/2007 | Sechrest |
| 7,231,497 B2 | 6/2007 | Trika |
| 7,284,149 B1 | 10/2007 | Fisher |
| 7,366,740 B2 | 4/2008 | Sleeman et al. |
| 7,366,866 B2 | 4/2008 | Cochran |
| 7,380,090 B2 | 5/2008 | Koseki |
| 7,409,537 B2 | 8/2008 | Tsang |
| 7,412,369 B1 | 8/2008 | Gupta |
| 7,412,562 B2 | 8/2008 | Garney |
| 7,451,353 B2 | 11/2008 | Grimsrud |
| 7,472,230 B2 | 12/2008 | Prabhu |
| 7,490,197 B2 * | 2/2009 | Kirshenbaum ..... G06F 12/0866 709/205 |
| 7,590,795 B2 | 9/2009 | Sinclair |
| 7,620,983 B1 | 11/2009 | Satish |
| 7,631,140 B2 | 12/2009 | Saito |
| 7,644,239 B2 | 1/2010 | Ergan et al. |
| 7,698,506 B1 | 4/2010 | Fair |
| 7,698,513 B2 | 4/2010 | Sechrest |
| 7,774,508 B2 | 8/2010 | Nakamura |
| 7,805,571 B2 * | 9/2010 | Kirshenbaum ..... G06F 12/0866 709/205 |
| 7,814,261 B2 | 10/2010 | Lee |
| 7,818,701 B1 | 10/2010 | Kolokowsky |
| 7,849,502 B1 | 12/2010 | Bloch |
| 7,873,782 B2 | 1/2011 | Terry |
| 7,945,734 B2 | 5/2011 | Lahcanski |
| 7,953,774 B2 | 5/2011 | Cong |
| 8,006,037 B2 * | 8/2011 | Kirshenbaum ..... G06F 12/0866 709/205 |
| RE42,727 E | 9/2011 | Kang |
| 8,032,707 B2 | 10/2011 | Iyigun |
| 8,032,723 B2 | 10/2011 | Sechrest |
| 8,041,904 B2 | 10/2011 | Ergan |
| 8,074,014 B2 | 12/2011 | Narayanan |
| 8,108,450 B2 | 1/2012 | Cong |
| 8,135,914 B2 | 3/2012 | Iyigun |
| 8,255,645 B2 | 8/2012 | Ergan et al. |
| 8,352,464 B2 | 1/2013 | Fotev |
| 8,539,186 B2 | 9/2013 | Sechrest |
| 8,631,203 B2 | 1/2014 | Fortin |
| 8,756,375 B2 | 6/2014 | Flynn |
| 8,909,861 B2 * | 12/2014 | Kirshenbaum ..... G06F 12/0866 711/100 |
| 2001/0007123 A1 | 7/2001 | Seguchi |
| 2001/0007999 A1 | 7/2001 | Rasmussen |
| 2001/0028603 A1 | 10/2001 | Shimazu |
| 2001/0047462 A1 | 11/2001 | Dimitroff et al. |
| 2002/0004876 A1 | 1/2002 | Timmer et al. |
| 2002/0073276 A1 | 6/2002 | Howard |
| 2002/0083275 A1 | 6/2002 | Kawamoto |
| 2002/0087797 A1 | 7/2002 | Adrangi |
| 2002/0087816 A1 | 7/2002 | Atkinson |
| 2002/0091702 A1 | 7/2002 | Mullins |
| 2002/0108017 A1 | 8/2002 | Kenchammana-Hoskote |
| 2002/0143521 A1 | 10/2002 | Call |
| 2002/0152422 A1 | 10/2002 | Sharma et al. |
| 2002/0156970 A1 | 10/2002 | Stewart |
| 2002/0171966 A1 | 11/2002 | Ottesen et al. |
| 2002/0178326 A1 | 11/2002 | Ohta |
| 2002/0184311 A1 | 12/2002 | Traversat |
| 2002/0198891 A1 | 12/2002 | Li et al. |
| 2002/0199075 A1 | 12/2002 | Jacobs |
| 2003/0009538 A1 | 1/2003 | Shah |
| 2003/0041213 A1 | 2/2003 | Tokar |
| 2003/0070065 A1 | 4/2003 | Fleming |
| 2003/0074524 A1 | 4/2003 | Coulson |
| 2003/0074550 A1 | 4/2003 | Wilkes et al. |
| 2003/0101320 A1 | 5/2003 | Chauvel et al. |
| 2003/0110357 A1 | 6/2003 | Nguyen |
| 2003/0154314 A1 | 8/2003 | Mason et al. |
| 2003/0154337 A1 | 8/2003 | Ohno et al. |
| 2003/0158839 A1 | 8/2003 | Faybishenko et al. |
| 2003/0177305 A1 | 9/2003 | Hetrick |
| 2003/0191916 A1 | 10/2003 | McBrearty et al. |
| 2003/0202377 A1 | 10/2003 | Harari |
| 2003/0212660 A1 | 11/2003 | Kerwin |
| 2003/0212857 A1 | 11/2003 | Pacheco et al. |
| 2003/0217299 A1 | 11/2003 | Neuman |
| 2004/0003003 A1 | 1/2004 | McCartney et al. |
| 2004/0003223 A1 | 1/2004 | Fortin et al. |
| 2004/0010639 A1 | 1/2004 | Inoue |
| 2004/0015504 A1 | 1/2004 | Ahad et al. |
| 2004/0019762 A1 | 1/2004 | Fukuoka |
| 2004/0024795 A1 | 2/2004 | Hind et al. |
| 2004/0034765 A1 | 2/2004 | O'Connell |
| 2004/0044776 A1 | 3/2004 | Larkin |
| 2004/0044849 A1 | 3/2004 | Stence |
| 2004/0059747 A1 | 3/2004 | Olarig et al. |
| 2004/0068627 A1 | 4/2004 | Sechrest |
| 2004/0078508 A1 | 4/2004 | Rivard |
| 2004/0093463 A1 | 5/2004 | Shang |
| 2004/0103238 A1 | 5/2004 | Avraham |
| 2004/0107200 A1 | 6/2004 | Sjogren et al. |
| 2004/0136259 A1 | 7/2004 | Kiint |
| 2004/0148611 A1 | 7/2004 | Manion |
| 2004/0153694 A1 | 8/2004 | Nicholson |
| 2004/0162950 A1 | 8/2004 | Coulson |
| 2004/0168018 A1 | 8/2004 | Aasheim |
| 2004/0172576 A1 | 9/2004 | Yoshii |
| 2004/0174631 A1 | 9/2004 | Tanaka et al. |
| 2004/0221030 A1 | 11/2004 | Huras |
| 2004/0221089 A1 | 11/2004 | Sato |
| 2004/0230743 A1 | 11/2004 | Ware et al. |
| 2004/0243612 A1 | 12/2004 | Bailey |
| 2005/0005188 A1 | 1/2005 | Hsu |
| 2005/0021907 A1 | 1/2005 | Shimada |
| 2005/0111260 A1 | 5/2005 | Nazarian |
| 2005/0125708 A1 | 6/2005 | Simon |
| 2005/0138283 A1 | 6/2005 | Garney |
| 2005/0141284 A1 | 6/2005 | Futatsuyarna |
| 2005/0145923 A1 | 7/2005 | Chen |
| 2005/0149750 A1 | 7/2005 | Lisanke et al. |
| 2005/0160223 A1 | 7/2005 | Chen |
| 2005/0160233 A1 | 7/2005 | Van Doren et al. |
| 2005/0172067 A1 | 8/2005 | Sinclair |

(56) References Cited

U.S. PATENT DOCUMENTS

| | | |
|---|---|---|
| 2005/0193160 A1 | 9/2005 | Bhatt |
| 2005/0204091 A1 | 9/2005 | Kilbuck |
| 2005/0228964 A1 | 10/2005 | Sechrest |
| 2005/0235119 A1 | 10/2005 | Sechrest |
| 2005/0239494 A1 | 10/2005 | Klassen et al. |
| 2005/0246487 A1 | 11/2005 | Ergan |
| 2005/0251617 A1 | 11/2005 | Sinclair |
| 2005/0262378 A1 | 11/2005 | Sleeman et al. |
| 2005/0268038 A1 | 12/2005 | Yasue |
| 2005/0278481 A1 | 12/2005 | Lakhani |
| 2005/0286855 A1 | 12/2005 | Saitou |
| 2006/0010293 A1 | 1/2006 | Schnapp |
| 2006/0074953 A1 | 4/2006 | Dettinger |
| 2006/0075185 A1 | 4/2006 | Azzarito |
| 2006/0080553 A1 | 4/2006 | Hall |
| 2006/0087893 A1 | 4/2006 | Nishihara |
| 2006/0090031 A1 | 4/2006 | Kirshenbaum |
| 2006/0106889 A1 | 5/2006 | Mannby |
| 2006/0112195 A1 | 5/2006 | Aoyama |
| 2006/0112215 A1 | 5/2006 | Kim |
| 2006/0136472 A1 | 6/2006 | Jujjuri |
| 2006/0136664 A1 | 6/2006 | Trika |
| 2006/0143241 A1 | 6/2006 | Bradshaw |
| 2006/0155931 A1 | 7/2006 | Birrell |
| 2006/0177067 A1 | 8/2006 | Kim |
| 2006/0236034 A1 | 10/2006 | Pomaranski |
| 2006/0248276 A1 | 11/2006 | Kilian |
| 2006/0248387 A1 | 11/2006 | Nicholson |
| 2006/0277359 A1 | 12/2006 | Faber |
| 2007/0005882 A1 | 1/2007 | Gallagher |
| 2007/0011405 A1 | 1/2007 | Adusumilli |
| 2007/0033356 A1 | 2/2007 | Erlikhman |
| 2007/0043787 A1 | 2/2007 | Cannon |
| 2007/0043929 A1 | 2/2007 | Safford |
| 2007/0061511 A1 | 3/2007 | Faber |
| 2007/0061577 A1 | 3/2007 | Van De Kerkhof |
| 2007/0073764 A1 | 3/2007 | Oks et al. |
| 2007/0150966 A1 | 6/2007 | Kirschner |
| 2007/0156954 A1 | 7/2007 | Trika |
| 2007/0162700 A1 | 7/2007 | Fortin |
| 2007/0207800 A1 | 9/2007 | Daley |
| 2007/0208910 A1 | 9/2007 | Koseki |
| 2007/0233939 A1 | 10/2007 | Kim |
| 2007/0266199 A1 | 11/2007 | Peled |
| 2007/0244474 A1 | 12/2007 | Panabaker |
| 2007/0294504 A1 | 12/2007 | Peled |
| 2008/0010401 A1 | 1/2008 | Royer, Jr. |
| 2008/0010415 A1 | 1/2008 | Sawdey |
| 2008/0109625 A1 | 5/2008 | Erlingsson |
| 2008/0162485 A1 | 7/2008 | Long |
| 2008/0172519 A1 | 7/2008 | Shmulevich |
| 2008/0183958 A1 | 7/2008 | Cheriton |
| 2009/0112949 A1 | 4/2009 | Ergan |
| 2009/0144495 A1 | 6/2009 | Kirshenbaum |
| 2009/0150335 A1 | 6/2009 | Latorre |
| 2009/0150599 A1 | 6/2009 | Bennett |
| 2009/0150611 A1 | 6/2009 | Fortin |
| 2009/0287890 A1 | 11/2009 | Bolosky |
| 2010/0037001 A1 | 2/2010 | Langlois |
| 2010/0070101 A1 | 3/2010 | Benes |
| 2010/0070701 A1 | 3/2010 | Iyigun |
| 2010/0070747 A1 | 3/2010 | Iyigun |
| 2010/0082550 A1 | 4/2010 | Cong |
| 2010/0199043 A1 | 8/2010 | Sechrest |
| 2010/0199063 A1 | 8/2010 | Sechrest |
| 2010/0217929 A1 | 8/2010 | Kirshenbaum |
| 2010/0280999 A1 | 11/2010 | Atluri |
| 2011/0197016 A1 | 8/2011 | Cong |
| 2011/0276743 A1 | 11/2011 | Kirshenbaum |
| 2011/0314202 A1 | 12/2011 | Iyigun |
| 2012/0047323 A1 | 2/2012 | Sareen et al. |
| 2012/0102265 A1 | 4/2012 | Cong |
| 2012/0173824 A1 | 7/2012 | Iyigun |
| 2012/0290785 A1 | 11/2012 | Ergan |
| 2014/0047189 A1 | 2/2014 | Fortin |

FOREIGN PATENT DOCUMENTS

| | | |
|---|---|---|
| CN | 1465009 A | 12/2003 |
| CN | 101236530 A | 8/2008 |
| EP | 0547992 | 6/1993 |
| EP | 0712067 | 5/1996 |
| EP | 0744697 A1 | 11/1996 |
| EP | 1960888 B1 | 1/2013 |
| JP | 57-161933 | 10/1982 |
| JP | 60-140446 | 7/1985 |
| JP | 60-140466 A | 7/1985 |
| JP | 01-303547 | 12/1989 |
| JP | 02-039256 | 2/1990 |
| JP | 03-147157 | 6/1991 |
| JP | 03294942 A | 12/1991 |
| JP | 04-205634 | 7/1992 |
| JP | 4246746 A | 9/1992 |
| JP | 05-059537 | 3/1993 |
| JP | 05-064931 | 3/1993 |
| JP | 57-161933 | 3/1993 |
| JP | 562329 A | 3/1993 |
| JP | 594353 A | 4/1993 |
| JP | 05-158797 | 6/1993 |
| JP | 05-233392 A | 9/1993 |
| JP | 5225066 A | 9/1993 |
| JP | 05-282889 | 10/1993 |
| JP | 06-035802 | 2/1994 |
| JP | 683708 A | 3/1994 |
| JP | 06231043 A | 8/1994 |
| JP | 6236351 A | 8/1994 |
| JP | 06-324817 A | 11/1994 |
| JP | 7253935 A | 10/1995 |
| JP | 10091488 A | 9/1996 |
| JP | 8263380 A | 10/1996 |
| JP | 09046366 A | 4/1997 |
| JP | 09-146710 | 6/1997 |
| JP | 09-190382 | 7/1997 |
| JP | 09-214028 | 8/1997 |
| JP | 10-040170 | 2/1998 |
| JP | 10-154101 | 6/1998 |
| JP | 10-289155 | 10/1998 |
| JP | 11-259361 | 9/1999 |
| JP | 11-316699 | 11/1999 |
| JP | 11-338641 | 12/1999 |
| JP | 2000-148515 | 5/2000 |
| JP | 2000-194645 A | 7/2000 |
| JP | 2000-235544 | 8/2000 |
| JP | 2001-27967 A | 3/2001 |
| JP | 2001-243021 A | 9/2001 |
| JP | 2001-250315 A | 9/2001 |
| JP | 2002-007185 | 1/2002 |
| JP | 2002-259186 A | 9/2002 |
| JP | 2002-323959 A | 11/2002 |
| JP | 2002-342037 | 11/2002 |
| JP | 2003-076498 | 3/2003 |
| JP | 2003-085041 | 3/2003 |
| JP | 2003-196032 | 7/2003 |
| JP | 2003296772 | 10/2003 |
| JP | 2003-316647 | 11/2003 |
| JP | 2004-021370 | 1/2004 |
| JP | 2004-054845 | 2/2004 |
| JP | 2004-192403 | 7/2004 |
| JP | 2004-272324 | 9/2004 |
| JP | 2004-272764 A | 9/2004 |
| JP | 2005-044010 | 2/2005 |
| JP | 2005-222383 | 8/2005 |
| JP | 2005-339256 A | 12/2005 |
| JP | 2007-007185 | 1/2007 |
| JP | 2007-233896 A | 9/2007 |
| JP | 2008-052321 | 3/2008 |
| KR | 1019990019377 | 3/1999 |
| KR | 1020000009727 | 7/2000 |
| RU | 2010317 | 3/1994 |
| RU | 2 096 824 C1 | 11/1997 |
| RU | 2 189 073 C2 | 9/2002 |
| TW | 190585 | 9/1992 |
| TW | 479194 B | 3/2002 |
| TW | 502165 A1 | 9/2002 |
| TW | 200402628 A | 2/2004 |

(56) References Cited

FOREIGN PATENT DOCUMENTS

| TW | 200405170 A | 4/2004 |
|---|---|---|
| TW | I347515 | 8/2011 |
| WO | 93/18461 A1 | 9/1993 |
| WO | 97/26600 | 7/1997 |
| WO | 98/10611 | 3/1998 |
| WO | 99/53439 A2 | 10/1999 |
| WO | 00/49488 A1 | 8/2000 |
| WO | 01/11486 A2 | 2/2001 |
| WO | 01/57675 A1 | 8/2001 |
| WO | 01/75581 A1 | 10/2001 |
| WO | 02/01364 A2 | 1/2002 |
| WO | 02/01365 A2 | 1/2002 |
| WO | 0201364 A2 | 1/2002 |

OTHER PUBLICATIONS

U.S. Appl. No. 12/366,112, filed Feb. 5, 2009, Kirshenbaum.
U.S. Appl. No. 12/775,168, filed May 6, 2010, Kirshenbaum.
U.S. Appl. No. 13/187,757, filed Jul. 21, 2011 Kirshenbaum.
U.S. Appl. No. 14/530,661, filed Oct. 31, 2014, Kirshenbaum.
U.S. Appl. No. 60/416,115, filed Oct. 4, 2002, Sechrest.
U.S. Appl. No. 10/325,591, filed Dec. 20, 2002, Sechrest.
U.S. Appl. No. 11/150,686, filed Jun. 9, 2005, Sechrest.
U.S. Appl. No. 11/150,728, filed Jun. 9, 2005, Sechrest.
U.S. Appl. No. 12/759,526, filed Apr. 13, 2010, Sechrest.
U.S. Appl. No. 12/759,536, filed Apr. 13, 2010, Sechrest.
U.S. Appl. No. 10/837,986, filed May 3, 2004, Ergan.
U.S. Appl. No. 12/627,710, filed Nov. 30, 2009, Ergan.
U.S. Appl. No. 13/231,088, filed Sep. 13, 2011, Ergan.
U.S. Appl. No. 13/555,803, filed Jul. 23, 2012, Ergan.
U.S. Appl. No. 11/303,382, filed Dec. 16, 2005, Fortin.
U.S. Appl. No. 14/058,078, filed Oct. 18, 2013, Fortin.
U.S. Appl. No. 11/953,312, filed Dec. 10, 2007, Fortin.
U.S. Appl. No. 14/076,576, filed Nov. 11, 2013, Fortin.
U.S. Appl. No. 12/234,411, filed Sep. 19, 2008, Cong.
U.S. Appl. No. 13/087,927, filed Apr. 15, 2011, Cong.
U.S. Appl. No. 13/343,985, filed Jan. 5, 2012, Cong.
U.S. Appl. No. 14/259,065, filed Apr. 22, 2014, Cong.
U.S. Appl. No. 61/097,079, filed Sep. 15, 2008, Iyigun.
U.S. Appl. No. 12/271,472, filed Nov. 14, 2008, Iyigun.
U.S. Appl. No. 14/708,525, filed May 11, 2015, Iyigun.
U.S. Appl. No. 12/271,400, filed Nov. 14, 2008, Iyigun.
U.S. Appl. No. 13/221,542, filed Aug. 30, 2011, Iyigun.
U.S. Appl. No. 13/365,093, filed Feb. 2, 2012, Iyigun.
IN First Examination Report for Application No. 2682/DEL/2005, Oct. 20, 2014.
EP Communication for Application No. 05103690.3-2201, Reference EP34981TE900kap, Apr. 24, 2008.
TW Search Report for Application No. 101110178, Aug. 28, 2014.
JP Examiner's Decision of Refusal for Application No. 2012-243915, Jan. 6, 2015.
JP Decision of Refusal for Application No. 2012-111004, Jul. 29, 2014.
AU Examiner's first report on patent application No. 2005219500, Reference 12671530/DBW, May 31, 2010.
EP Communication for Application No. 05109295.5-2201, Reference EP36830RK900dfi, Jan. 28, 2008.
Watanabe, "Knowledge Integration for Architectural Design", Knowledge-Based Computer-Aided Architectural Design, Jul. 1994,123-146.
Waugh, "Specifying Metadata Standards for Metadata Tool Configuration", Computer Networks and ISDN Systems, Apr. 1998, 30(1-7), 23-32.
Wilcox, "Object Databases-Object Methods in Distributed Computing", Dr. Dobbs Journal, Nov. 1994,19(13), 26-34.
Wold et al., "Content-Based Classification, Search, and Retrieval of Audio", IEEE Multimedia, Fall 1996, 3(3), 27-36.
Yoshikawa et al., "XRel; a Path-Based Approach to Storage and Retrieval of XML Documents Using Relational Databases", ACM Transactional on Internet technology, Aug. 2001,1(1),1-29.
Haining, "Non-Volatile Cache Management for Improving Write Response Time with Rotating Magnetic Media", Sep. 2000.
JP Notice of Reason for Rejection for Application No. 2011-526951, Jul. 11, 2014.
CN Decision on Rejection for Application No. 200980145878.1, Apr. 4, 2014.
JP Final Notification of Reason(s) for Refusal for Application No. 2012-243915, Mar. 25, 2014.
CA Office Action for Application No. 2,523,761, Feb. 26, 2014.
JP Notification of Reason(s) for Refusal for Application No. 2012-111004, Nov. 19, 2013.
KR Final Notice of Preliminary Rejection for Application No. 10-2008-7014092, Nov. 28, 2013.
JP Notice of Reasons for Rejection for Application No. 2011-526951, Dec. 16, 2013.
EP Communication for Application No. 09813565.0-1229 / 2329360 PCT/US2009056419, Reference FB24240, Apr. 3, 2012.
EP Communication for Application No. 09826570.5-1229 / 2353081 PCT/US2009063127, Reference FB24586, May 29, 2012.
Budiu, "A Dual-Disk File System: ext4", Apr. 16, 1997.
CN Notice on the First Office Action for Application No. 200980137190.9, Oct. 24, 2012.
Dove, "Windows XP for embedded applications", Jul. 10, 2008.
EP Communication for Application No. 09814983.4-2224 / 2329361 PCT/US2009055198, Reference FB24231, Oct. 10, 2012.
iSCSI, "Performance evaluations of iSCSI implementation", printed Jan. 10, 2008.
JP Notice of Rejection for Application No. 2011-527865, Oct. 16, 2012.
Matthews, "Improving File System Performance With Adaptive Methods", Fall 1999.
Mitchell, "Managing Cache Coherence in Multiprocessor Computer Systems", printed Jul. 10, 2008.
Nieplocha, "ARMCI: A Portable Aggregate Remote Memory Copy Interface", Oct. 30, 2000.
Novell NetWare® 6, "Novell Storage Services Administration Guide", Feb. 2002.
PCT Internatonal Search Repor and Writen Opinion for Applicaton No. PCT/US2009/055198, reference 324268-02WO, Feb. 26, 2010.
CN Notice on the First Office Action for Application No. 200980136912.9, Jan. 14, 2013.
Ohn, "Path conscious caching of B+ tree indexes in a shared disks cluster", ScienceDirect, Available online Dec. 15, 2006.
PCT Intenatonal Search Report and Written Opinion for Application No. PCT/US2009/056419, reference 325076-03WO, Mar. 12, 2010.
PCT International Search Report and Written Opinion for Application No. PCT/US2009/063127, reference 325668-02WO, May 31, 2010.
Zhu, "Power Aware Storage Cache Management", IEEE Transactions on Computers, May 2005.
Bisson, "A Hybrid Disk-Aware Spin-Down Algorithm with I/O Subsystem Support", IEEE International Performance, Computing, and Communications Conference, Apr. 11-13, 2007.
Huffman, "Non-Volatile Memory Host Controller Interface (NVMHCI) 1.0", Apr. 14, 2008.
Greenan, "CompulsiveFS: Making NVRAM Suitable for Extremely Reliable Storage", Proceedings of the 5th USENIX Conference on File and Storage Technologies, Feb. 13-16, 2007.
Darden, "Data Integrity: The Dell/EMC Distinction", May 2002.
Archer, "ReadyBoost—Using Your USB Key to Speed Up Windows Vista", Apr. 14, 2006.
Archer, "ReadyBoost Q&A", Jun. 2, 2006.
Allchin, "Microsoft Explains Vista ReadyBoost", CDRinfo, Nov. 21, 2006.
Vitter, "External Memory Algorithms", Proceedings of the Seventeenth ACM SIGACT-SIGMOD-SIGART Symposium on Principles of Database Systems, Jun. 1-3, 1998.

(56) References Cited

OTHER PUBLICATIONS

Ekman, "TLB and Snoop Energy-Reduction using Virtual Caches in Low-Power Chip-Multiprocessors", Proceedings of the 2002 International Symposium on Low Power Electronics and Design, Aug. 12-14, 2002.
CN Notice on the Second Office Action for Application No. 200980145878.1, Sep. 16, 2013.
JP Decision to Decline the Amendment for Application No. 2005-135274, Jul. 3, 2012.
JP Final Rejection for Application No. 2005-135274, Jul. 3, 2012.
JP Notice of Rejection for Application No. 2003-347507, Mar. 26, 2010.
JP Notice of Rejection for Application No. 2003-347507, Nov. 30, 2010.
CA Office Action for Application No. 2,442,188, Mar. 10, 2010.
AU Examiner's first report on patent application No. 2003243990, Jan. 23, 2009.
KR Notice of Preliminary Rejection for Application No. 1 0-2003-69015, Nov. 30, 2009.
RU Official Action for Application No. 2003129662, Sep. 14, 2007.
MX Office Action for Application No. PA/a/2003/008766, Jul. 28, 2007.
EP Communication for Application No. 03022573.4-1229, Reference EP28554-/df, Jul. 14, 2010.
AU Examiner's first report on patent application No. 2010201717, Jun. 28, 2011.
CA Examiner's Report for Application No. 2,523,761, Feb. 26, 2013.
EP Communication for Application No. 05109295.5-2201, Reference EP36830RK900dfi, Oct. 28, 2008.
EP Result of consultation for Application No. 05109295.5-2201, Reference EP36830RK900dfi, Jun. 12, 2012.
JP Final Rejection for Application No. 2005-306948, Jan. 13, 2012.
KR Notice of Preliminary Rejection for Application No. 1 0-2005-0099666, Apr. 30, 2012.
EP Communication for Application No. 06839426.1-1229, Reference FB20211, Sep. 2, 2011.
EP Communication for Application No. 06839426.1-1229, Reference FB20211, Oct. 28, 2011.
Fox, "Invention: The phantom car", NewScientist.com, Aug. 17, 2005.
MY Adverse Report for Application No. PI 20081667, Aug. 30, 2013.
JP Notice of Rejection for Application No. 2012-111004, May 14, 2013.
IN First Examination Report for Application No. 1 086/DEL/2005, Sep. 10, 2013.
JP Notice of Rejection for Application No. 2012-243915, Jul. 9, 2013.
CA Office Action for Application No. 2,723,077, Jan. 9, 2013.
CN Notice on the Third Office Action for Application No. 200980137190.9, Aug. 1, 2013.
CN Decision on Rejection for Application No. 200980136912.9, Aug. 1, 2013.
KR Reasons for Rejection for Application No. 1 0-2008-7014092, Reference 314396.08, May 30, 2013.
IL Notification of Defects in Patent Application No. 191502, Feb. 17, 2013.
CN Notice on the Second Office Action for Application No. 200980137190.9, Mar. 20, 2013.
CN Notice on the First Office Action for Application No. 200980145878.1, Jan. 29, 2013.
CN First Office Action for Application No. 200510083792.4, Feb. 1, 2008.
CN Second Office Action for Application No. 200510083792.4, Jun. 27, 2008.
CN Decision on Rejection for Application No. 200680047384.6, Nov. 11, 2010.
EP Communication for Application No. 05103697.8-2201, Reference EP34979TE900dfi, May 21, 2007.
EP Communication for Application No. 05 103697.8-2201, Reference EP34979TE900dfi, Oct. 26, 2007.
EP Communication for Application No. 05 103 697.8-2201, Reference EP34979TE900dfi, Jun. 17, 2008.
EP Communication for Application No. 05 103 697.8-2201, Reference EP34979TE900dfi, Nov. 7, 2008.
JP Notice of Rejection for Application No. 2005-135274, Sep. 24, 2010.
JP Notice of Rejection for Application No. 2005-135274, Sep. 9, 2011.
RU Official Action for Application No. 2003129662, Nov. 9, 2007.
EP Communication for Application No. 03022573.4-1229, Reference EP28554-/df, Aug. 2, 2007.
EP Communication for Application No. 03 022 573.4-1229, Reference EP28554-/df, Nov. 8, 2007.
EP Communication for Application No. 03 022 573.4-1229, Reference EP28554-/df, Oct. 6, 2008.
Search Report for Taiwan Patent Application No. 094114140, Nov. 22, 2011, 2 pages.
Notice of Rejection in Japanese Patent Application No. 2005-134492 dated Jan. 25, 2011.
"Computervision Launches Design Automation Development Platform for Windows, UNIX Desktop Applications", PR Newswire, Financial News, Jan. 10, 1995, 3 pages.
"Developers Guide to Apple Data Detectors-For Version 1.0.2", Apple Computer, Inc., Nov. 1997, 1-34.
"Mechanical Design Software (Buyers Guide)", Computer-Aided Engineering, Dec. 1993,12(12), 32-36.
"Oracle 9i SQL Reference", Release 2 (9.2), Oct. 2002, 29 pages.
Anderson et al., "Referential Integrity Implementation Details and Advantages", IBM Technical Disclosure Bulletin, Mar. 1, 1995, 38(3), 477-487.
Andrews et al., "Combining Language and Database Advances in an Object-Oriented Development Environment", Conference on Object Oriented Programming Systems Languages and Applications, Orlando, Florida, United States, Oct. 4-8, 1987, 430-440.
Ballard et al., "Improved Recovery From Partial Page Writes of Data Pages", IBM technical Disclosure Bulletin, May 1, 1993, 36(5), 141-143.
Beard et al., "Multilevel and Graphical Views of Metadata", Fifth International Forum on Research and Technology Advances in Digital Libraries, Santa Barbara, California, Apr. 22-24, 1998, 256-265.
Beitner et ai, "Multimedia Support and Authoring in Microcosm, and extended model", Department of Electronics and Computer Science, University of Southampton, 1994, 12 pages.
Berg. "How Do I Create Persistent Java Objects?", Dr. Dobb's Journal, Apr. 1, 1997,22(4), 98-101.
EP Summons to attend oral proceedings, Reference EP36830RK900dfi, for Application No. 05109295.5-2201/ 1650666, Mar. 8, 2012.
Motoazabu, "IEEE1394: A Dream Interface at the Turning Point", PC User, Japan. Oct. 24, 1999.
EP Decision to refuse a European Patent application No. 05 109295.5-2201, Reference EP36830RK900dfi, Aug. 7, 2012.
CN First Office Action for Application No. 200510116208.0, Jun. 6, 2008.
CN First Office Action for Application No. 200680047384.6, Jan. 22, 2010.
EP Provision of the minutes of the oral proceedings for Application No. 05 109 295.5-2201, Reference EP36830RK900dfi, Aug. 7, 2012.
JP Notice of Reasons for Rejection for Application No. 2008-545888, Aug. 29, 2012.
EP Result of consultation for Application No. 05109295.5-2201, Reference EP36830RK900dfi, Jun. 15, 2012.
EP Provision of the minutes of the oral proceedings for Application No. 05 109 295.5-2201, Reference EP36830RK900dfi, Aug. 1, 2012.
JP Notice of Reasons for Rejection for Application No. 2008-545888, Apr. 19, 2012.
EP Supplementary Search Report for Application No. 06839426, search completed on May 4, 2009.

(56) References Cited

OTHER PUBLICATIONS

PCT International Search Report and Written Opinion for Application No. PCT/US2006/048402, May 8, 2007.
"Optimization of CF Host Operation," SanDisk® Corporation, Feb. 28, 2005.
"Optimizing Program/Erase Times," Spansion TM, Sep. 2, 2004.
Notice of Rejection, Translation from Japanese Patent Application No. 2005-306948, Mar. 11, 2011.
"Memory Accelerator," NewScientist.com, printed Aug. 26, 2005, http://ww.newscientist.com/articie.ns?id=dn7857&feedld=online-news_rss20.
Anderson et al., "A Case for Buffer Servers," Hot Topics in operating Systems, Proceedings of the Seventh Workshop on Rio Rico, AZ, Mar. 29-30, 1999, XP010355835.
European Search Report for 05109295.5 mailed Jun. 8, 2007.
Office Action issued in U.S. Appl. No. 12/366,112 dated Sep. 29, 2009.
Office Action issued in U.S. Appl. No. 10/970,772 dated May 18, 2007.
Final Office Action issued in U.S. Appl. No. 10/970,772 dated Nov. 28, 2007.
Office Action issued in U.S. Appl. No. 10/970,772 dated May 28, 2008.
Bhattacharya et al., "Coordinating Backup/Recovery and Data Consistency Between Database and File Systems", International Conference on Management of Data, Madison, Wisconsin, USA, Jun. 4-6, 2002, 12 pages.
Biliris, "The Performance of Three Database Storage Structures for Managing Large Objects", ACM SIGMOD, Jun. 2-5, 1992, 21 (2), 276-285.
Booch, "Object-Oriented Analysis and Design with Applications", Cummings Publishing Co., 1994,155-156 and 179-183.
Bracchi et al., "Binary Logical Associations in Data Modeling", Modelling in Data Base Management Systems G.M. Nijssen, (ed), Proceeding of the IFIP Working Conference on Modelling in Data Base Management Systems, Freudenstadt, Germany, Jan. 5-8, 1976, 125-147.
Buneman et al., "Inheritance and Persistence in Database Programming Languages", International Conference on Management of Data, Washington, D.C., United States, Jun. 1986, 4-15.
Bullock et al., "Recovery of Data Pages after Partial Page Writes", IBM Technical Disclosure Bulletin, Aug. 1991, 34(3), 69-83.
Cammarata et al., "Extending a relational database with deferred referential integrity checking and intelligent joins", SIGMOD Record USA, Jun. 1989, 18(2), 88-97.
Chien, "Concurrent Aggregates (CA)—Design and Experience with a Concurrent Object—Oriented Language Based on Aggregates", Journal of Parallel and Distributed Computing, Mar. 1995, 25(2), 174-196.
Chryssostomidis et al., "Geometric Modeling Issues in Computer Aided Design of Marine Structures", Marine Technology Society Journal, Dec. 1988, 22(2), 15-33.
Ciccozzi, "Microsoft Press Computer Dictionary", Third Edition 1997, 3, 39-40.
D'Andrea et al., "UniSQL's next-generation object-relational database management system", ACM SIGMOD Record, Sep. 1996, 25(3), 70-76.
Darby, "Object Serialization in Java 1.1 Making Objects Persistent", Web Techniques, Sep. 1997, 2(9),55 and 58-59.
Dietrich, Jr., et al., "TGMS: An Object-Oriented System for Programming Geometry", Software-Practice and Experience, Oct. 1989, 19(10), 979-1013.
Dobashi et al., "Skylight for Interior Lighting Design", Computer Graphics Forum, Aug. 1994, 13(3), 85-96.
Dorsch, "Accel Signs with IBM to Buy Altium PCB Unit", EDA Licensing, Electronic New, Jan. 16, 1995, 3 pages.
EP Application No. 05103690: Partial European Search Report, Apr. 28, 2008, 7 pages.
Fegaras et al., "Optimizing Object Queries Using an Effective Calculus", ACM Transactions on Database Systems (TODS), Dec. 2000, 25(4),457-516.
Findler et al., "Contract Soundness for Object-Oriented Languages", ACM Conference on Object-Oriented Programming Systems, Languages, and Applications (OOPSLA), Nov. 2001, 36(11), 15 pages.
Foley et al., "Computer Graphics: Principles and Practices", Second Edition, Addison-Wesley Publishing Company, Jun. 15, 1990, Chapter 5 and 9, 201-283.
Friis-Christensen et al., "Requirements and Research issues in Geographic Data Modeling", Proceedings of the 9th ACM international symposium on Advances in geographic information systems, Atlanta, Georgia, USA, Nov. 9-10, 2001, 7 pages.
Fuh et al., "Implementation of SQL3 Structured Types with Inheritance and Value Substitutability", Digital Symposium Collection 2000 (Abstract only), Proceedings of 25th International Conference on Very Large Data Bases, Sep. 7-10, 1999, 2 pages.
Garret, Jr., et al., "An Object Oriented Environment for Representing Building Design and Construction Data", Advanced Construction Technology Center, Document No. 89-37-04, Jun. 1989, 1-34.
Goscinski, "Distributed Operating Systems, The Logical Design", Addison-Wesley Longman Publishing Co., Inc., Aug. 1991, 306-313.
Harrison et al., "Structure Editors: User-Defined Type Values and Type Inference", International Conference on Software Methods and Tools, 2000, Wollongong, NSW, Australia, Nov. 6-9, 2000, 241-247.
Haverlock, "Object Serialization, Java, and C++", Dr. Dobb's Journal, Aug. 1, 1998, 23(8), 5 pages.
Hay, "Data Model Patterns: Convention of Thought", Dorset House Publishing, New York, NY, 1996,47-67 and 235-259.
Hernandez et al., "The Merge/Purge Problem for Large Databases", International Conference on Management of Data and Symposium on Principles of Database Systems, Proceedings of the 1995 ACM SIGMOD International Conference on Management of Data, May 1995, 24(2), 12 pages.
Hsiao et al., "DLFM: A Transactional Resource Manager", International Conference on Management of Data, May 16-18, 2000, 518-528.
Kaneko et al., "Design of 3D CG Data Model of Move Animation Database System", Advanced Database Research and Development Series, Proceedings of the Second Far-East Workshop on Future Database Systems, Apr. 1992, 2, 364-372.
Katz, "Toward a Unified Framework for Version Modeling in Engineering Databases", ACM Computing Surveys (CSUR), Dec. 1990, 22(4), 375-408.
Kawabe et al., "A Framework for 3D Modeling Constraint-Based Description and Non-Manifold Geometric Modeling", A Collection of Contributions based on Lectures Presented at the 2nd Toyota Conference, Organization of Engineering Knowledge for Product Modeling in Computer Integrated Manufacturing, Japan, Oct. 2-5, 1988, 325-357.
Kempfer, "CAD Jumps on Windows 3.1 Bandwagon", Computer Aided Engineering, Nov. 1993, 24-25.
Khan et al., "A Performance Evaluation of Storing XML Data in Relational Database Management Systems", Proceedings of the 3rd international workshop on Web information and data management, WIDM, Nov. 5-10, 2001, 31-38.
Khoshafian et al., "Object Indentify", OOPSLA'86, Proceedings, Sep. 1986, 21, 406-416.
Kiesling, "ODBC in UNIX Environments", Dr. Dobb's Journal, Dec. 2002, 27(12), 16-22.
King et al., "TriStarp—An Investigation into the Implementation and Exploitation of Binary Relational Storage Structures", Proceedings of 8.sup.th (BNCOD) British National Conference on Data Bases, Jul. 9-11, 1990,64-84.
Krouse, "Geometric Models for CAD/CAM", Machine Design, Jul. 24, 1980,99-105.
LeBlanc et al., "Design Data Storage and Extraction Using Objects", Concurrent Engineering: Research and Applications, Mar. 7, 1992, 1, 31-38.

(56) References Cited

OTHER PUBLICATIONS

Leontiev et al., "On Type Systems for Object-Oriented Database Programming Languages", ACM Computing Surveys, Dec. 2002, 34(4), 1-50.
Levy et al., "Incremental Recovery in Main Memory Database Systems", IEEE Transactions on Knowledge and Data Engineering, Dec. 1992, 4(6), 529-540.
Lim et al., "Transaction Processing in Mobile, Heterogeneous Database Systems", IEEE Transactions on Knowledge and Data Engineering, Nov. 2002, 14(6), 1330-1346.
Mallet et al., "Myrtle: A Set-Oriented Meta-Interpreter Driven by a "Relational" Trace for Deductive Databases Debugging", Lecture Notes in Computer Science, Apr. 30, 1999, 1559, 1-22.
Mariani, "Oggelto: An Object Oriented Database Layered on a Triple Store", The Computer Journal, Apr. 1992, 35(2), 108-118.
McMahon, "SED—A Non-Interactive Test Editor", Bell Laboratories, Aug. 15, 1978, 10 pages.
Melton et al., "SQL and Management of External Data", ACM SIGMOD Record, Mar. 2001, 30(1), 8 pages.
Mitchell, "The Logic of Architecture", Massachusetts Institute of Technology, Apr. 26, 1990, 139-143.
Navathe, "Evolution of Data Modeling for Databases", Communications of the ACM, Sep. 1992, 35(9), 112-123.
Nelson et al., "Generic Support for Caching and Disconnected Operation", 4th Workshop on Workstation Operatng Systems (WWOS-IV), Napa, CA, USA, Oct. 14-15, 1993, 5 pages.
Nijssen et al., "Conceptual Schema and Relational Database Design, A Fact Oriented Approach", Department of Computer Science, University of Queensland, Prentice Hall, Jun. 1989, 10-33,42-43,48-51, 156-171.
Orenstein et al., "Query Processing in the Object Store Database System", ACM SIGMOD, International Conference on Management of Data, Jun. 1992, 21 (2), 403-412.
Ottogalli et al., "Visualisation of Distributed Application for Performance Debugging", Lecture Notes in Computer Science, Jan. 2001, 2074,831-840.
Pachet et al., "A Combinatorial Approach to Content-Based Music Selection", Multimedia Computing and Systems, Florence, Jul. 1999, 1,6 pages.
Papiani et al., "A Distributed Scientific Data Archive Using the Web, XML and SQLIMED", SIGMOD Record, Sep. 1999, 28(3), 7 pages.
Ponnekanti et al., "Online Index Rebuild", Proceedings of the AMC SIGMOD International Conference on Management of Data, Dallas, Texas, United States, May 15-18, 2000, 529-538.
Powell, "Object, References, Identifiers, and Equality White Paper", OMG TC Document 93.7.5, Jul. 2, 1993,1-24.
Prosise, "2-D Drafting: Why Pay More?", PC Magazine: The Independent Guide to IBM-Standard Personal Computing, Feb. 23, 1993, 12(4), 255-289.
Ramsey et al., "An Algebraic Approach to File Synchronization", Software Engineering Notes, Association for Computing Machinery, Sep. 2001, 26(5), 175-185.
Read, III, "Developing the Next Generation Cockpit Display System", IEEE, Aerospace and Electronics Systems Magazine, Oct. 1996, 11(1 0), 25-28.
Reiner et al., "Benefits of X-based Three-Tier Client/Server Model with ESRI Applications", Virtual Solutions, Jun. 1995, 9 pages.
Rosenblum et al., "The Design and Implementation of a Log-Structured File System", Proceedings of the 13th ACM Symposium on Operating Systems Principles, Jul. 24, 1991, 1-15.
Rouse, "CAD Pioneers are Still Trailblazing", Machine Design, Oct. 22, 1987, 59(25), 117-122.
Roussopoulos et al., "Using Semantic Networks for Data Base Management", Proceedings of the 1st International Conference on Very Large Data Bases, Sep. 22-24, 1975, 144-172.
Santos et al., "Computer Aided Mechanical Engineering Design Environment for Concurrent Design Process", Proceedings of the 1993 ITEC Workshop on Concurrent Engineering Simulation in Concurrent Engineering, May 4-6, 1993, 71-83.

Seshadri, "Enhanced Abstract Data Types in Object-Relational Databases", The VLDB Journal, The International Journal on Very Large Databases, Aug. 1998, 7(3), 130-140.
Simoes et at., "A RISC-Microcontroller Based Photovoltaic System for Illumination Applications", Fifteenth Annual IEEE: Applied Power Electronics Conference and Exposition (APEC 2000), New Orleans, LA, USA, Feb. 6-10, 2000, 2,115-1156.
Simon, "Strategic Database Technology: Management for the Year 2000", Morgan Kaufmann Publishers, May 1995, 446 pages.
Singhal et al., "DDB: An Object Design Data Manager for VLSI CAD", Proceedings of the 1993 ACM SIGMOD international conference on Management of data, Washington, D.C., United States, May 26-28, 1993, 467-470.
Sreekanth et al., "A Specification Environment for Configuring a Discrete-Part Manufacturing System Simulation Infrastructure", International Conference on Systems. Man and Cybernetics, Le Touquet, France. Oct. 17-20, 1993, 1, 349-354.
Sreenath, "A Hybrid Computation Environment of Multibody Simulation, Mathematics and Computers in Simulation", Aug. 1992, 34(2),121-140.
Stevens, "Value in 3-D", Industry Week, Jan. 8, 1995, 45-46.
Stonebraker, "The Case for Partial Indexes", SIGMOD Record, Dec. 1989, 18(4), 8 pages.
Strickland, "Intersection of Relational and Object", Proceedings of the AM/FM International Conference XVII, Mar. 14-17, 1994,69-75.
Sutherland et al., "The Hybrid Object-Relational Architecture (HORA); an Integration of Object-Oriented and Relational Technology". Proceedings of the 1993 ACM/SIGAPP symposium on Applied computing; states of the art and practice, Indianapolis, Indiana, United States, Feb. 14-16, 1993, 326-333.
Suzuki et al., "Geometric Modeling for Modeling Products", Proceedings of the Third International Conference on Engineering Graphics and Descriptive Geometry, Vienna, Austria, Jul. 11-16, 1988, 2,237-243.
Taylor et al., "An Integrated Robot System Architecture", Proceedings of the IEEE. Jul. 1983, 71(7), 842-856.
Varlamis et al., "Bridging XML-Schema and Relational Databases. A System for generating and Manipulating Relational Databases using Valid XML Documents", DocEng' 01, Nov. 9-10, 2001, 10 pages.
CN Notice on the Third Office Action for Application No. 200980146878.1, May 6, 2016.
TW Search Report for Application No. 098129955, Jan. 26, 2015.
CN Decision on Reexamination for Application No. 200980145878. 1, Apr. 1, 2016.
Chinese State Intellectual Property Office, Author unknown, CN Notice on Grant of Patent Right for Invention for Application No. 200980145878.1, pp. 1-2, Aug. 19, 2016, China.
Chinese Patent Office, Author unknown, CN Notice on the Third Office Action for Application No. 200980136912.9, pp. 1-3, Sep. 9, 2016, China.
Brazil Patent Office, Author unknown, BR Office Action for Application No. PI0304297-9, Nov. 19, 2015, pp. 1-3, Brazil.
Brazil Patent Office, Author unknown, BR Office Action for Application No. PI0304297-9, Apr. 18, 2016, p. 1, Brazil.
Brazil Patent Office, Author unknown, BR Office Action for Application No. BR122016001493-2, May 10, 2016, pp. 1-2, Brazil.
Brazil Patent Office, Author unknown, BR Office Action for Application No. BR122016001493-2, Sep. 5, 2016, pp. 1-2, Brazil.
European Patent Office, Examiner Deane E, EP Summons to attend oral proceedings for Application No. 05103697.8, Dec. 17, 2015, 5 pages, Munich, Germany.
Taiwan Patent Office, Author unknown, TW Search Report for Application No. 098138300, Sep. 22, 2014, p. 1, Taiwan.
European Patent Office, Examiner Davide Mandato, EP Communication for Application No. 09826570.5, Aug. 17, 2015, 6 pages, Rijswijk, Netherlands.
Malaysian Patent Office, Author unknown, MY Certificate of Grant of a Patent for Application No. PI 20081667, Jul. 31, 2014, p. 1, Malaysia.

(56) References Cited

OTHER PUBLICATIONS

Singapore Intellectual Property Office, Author unknown, SG Notification of Grant for Application No. 2010092518, Jul. 22, 2014, 3 pages, Singapore.
Chinese State Intellectual Property Office, Author unknown, CN Notice on the Second Office Action for Application No. 200980136912.9, May 24, 2016, pp. 1-3, China.
Russian Patent Office, Attorney Tatiana Andreeva, RU Decision on Grant for Application No. 2008140263, Nov. 22, 2012, pp. 1-7, Russia.
Japanese Patent Office, JP Notice of Allowance for Application No. 2008-545888, Mar. 26, 2013, p. 1, Japan.
Chinese State Intellectual Property Office, Author unknown, CN Decision on Reexamination for Application No. 200980136912.9, Feb. 15, 2016, p. 1, China.
Chinese State Intellectual Property Office, Author unknown, CN Notice on Grant of Patent Right for Invention for Application No. 200980137190.9, Oct. 23, 2013, pp. 1-2, China.
Chinese State Intellectual Property Office, Author unknown, CN Notice on the Third Office Action for Application No. 200980145878.1, May 6, 2016, pp. 1-3, China.
Australian Patent Office, Author unknown, AU Notice of Acceptance for Application No. 2010201717, Oct. 18, 2011, 3 pages, Australia.
Japanese Patent Office, JP Notice of Allowance for Application No. 2011-526951, Feb. 12, 2015, p. 1, Japan.
Japanese Patent Office, JP Notice of Allowance for Application No. 2011-527865, May 21, 2013, p. 1, Japan.
Taiwan Intellectual Property Office, TW Notice of Allowance for Application No. 98129955, May 26, 2015, pp. 1-2, Taiwan.
European Patent Office, EP Communication under Rule 71(3) EPC: Intention to grant for Application No. 03022573.4, May 2, 2011, 6 pages, Netherlands.
European Patent Office, EP Invitation pursuant to Article 94(3) and Rule 71(1) EPC for Application No. 05109295.5, Dec. 16, 2009, 3 pages, Germany.
European Patent Office, EP Communication under Rule 71(3) EPC: Intention to grant for Application No. 06839426.1, Jul. 16, 2012, 6 pages, Netherlands.
Chinese State Intellectual Property Office, Author unknown, CN Notice on Grant of Patent Right for Invention for Application No. 200680047384.6, Sep. 23, 2011, pp. 1-2, China.
Canadian Intellectual Property Office, Author unknown, CA Notice of Allowance for Application No. 2,442,188, Feb. 22, 2011, 1 page, Canada.
Canadian Intellectual Property Office, Author unknown, CA Notice of Allowance for Application No. 2,523,761, Jan. 6, 2015, 1 page, Canada.
Canadian Intellectual Property Office, Author unknown, CA Notice of Allowance for Application No. 2,723,077, Feb. 17, 2014, 1 page, Canada.
Russian Patent Office, Attorney Tatiana M. Andreeva, RU Decision on Grant for Application No. 2003129662, Jul. 30 2008, pp. 1-7, Russia.
Australian Patent Office, Author unknown, AU Notice of Acceptance for Application No. 2003243990, Feb. 1, 2010, 3 pages, Australia.
Japanese Patent Office, JP Notice of Allowance for Application No. 2003-347507, Apr. 1, 2011, pp. 1-3, Japan.
Russian Patent Office, Attorney Yury D. Kuznetsov, RU Decision on Grant for Application No. 2005132448, Jan. 20, 2010, pp. 1-6, Russia.
Australian Patent Office, Author unknown, AU Examiner's report No. 2 for Application No. 2006331830, Feb. 1, 2011, 2 pages, Australia.
Australian Patent Office, Author unknown, AU Notice of Acceptance for Application No. 2005219500, Oct. 14, 2010, 3 pages, Australia.
Japanese Patent Office, JP Notice of Allowance for Application No. 2005-306948, Aug. 7, 2012, pp. 1-3, Japan.
Australian Patent Office, Author unknown, AU Notice of Acceptance for Application No. 2006331830, May 19, 2011, 3 pages, Australia.
Australian Patent Office, Author unknown, AU Examiner's first report for Application No. 2006331830, Nov. 29, 2010, 2 pages, Australia.
European Patent Office, EP Communication for Application No. 09814983.4, Dec. 15, 2016, 7 pages, Germany.
European Patent Office, EP Communication for Application No. 09826570.5, Oct. 11, 2016, 6 pages, Rijswijk, Netherlands.
European Patent Office, EP Summons to attend oral proceedings for Application No. 05103697.8, Nov. 11, 2016, 8 pages, Munich, Germany.
Chinese State Intellectual Property Office, Author unknown, CN Notice on Grant of Patent Right for Invention for Application No. 200510083792.4, Nov. 21, 2008, pp. 1-2, China.
Taiwan Intellectual Property Office, TW Notice of Allowance for Application No. 94114140, Apr. 23, 2012, pp. 1-2, Taiwan.
Taiwan Intellectual Property Office, TW Notice of Allowance for Application No. 101110178, Dec. 10, 2014, pp. 1-2, Taiwan.
U.S. Appl. No. 10/186,164, filed Jun. 27, 2002, Fortin.
U.S. Appl. No. 10/304,367, filed Nov. 26, 2002, Nicholson.
U.S. Appl. No. 10/372,734, filed Feb. 21, 2003, DeWhitt.
U.S. Appl. No. 15/216,059, filed Jul. 21, 2016, Ergan.
U.S. Appl. No. 15/340,826, filed Nov. 1, 2016, Fortin.
U.S. Appl. No. 15/229,025, filed Aug. 4, 2016, Cong.

\* cited by examiner

USING EXTERNAL MEMORY DEVICES TO IMPROVE SYSTEM PERFORMANCE

RELATED APPLICATION(S)

This Application is a Continuation of and claims benefit from U.S. patent application Ser. No. 14/530,661 that was filed on Oct. 31, 2014, and that is a Continuation of U.S. patent application Ser. No. 13/187,757 (U.S. Pat. No. 8,909, 861), that was filed on Jul. 21, 2011, (issued Dec. 9, 2014), and that is a Continuation of U.S. patent application Ser. No. 12/775,168 (U.S. Pat. No. 8,006,037) that was filed on May 6, 2010, (issued on Aug. 23, 2011), and that is a Continuation of U.S. patent application Ser. No. 12/366,112 (U.S. Pat. No. 7,805,571) that was filed on Feb. 5, 2009, (issued on Sep. 9, 2010), and that is a Continuation of U.S. patent application Ser. No. 10/970,772 (U.S. Pat. No. 7,490,197) that was filed on Oct. 21, 2004, (issued on Feb. 10, 2009), each of which is incorporated herein by reference in its entirety.

FIELD OF THE INVENTION

This invention relates generally to computer systems and, more particularly, relates to improving performance of computer systems.

BACKGROUND OF THE INVENTION

Computing devices such as personal computers, game consoles, smart phones, and the like often utilize a time-consuming process in order to load and cache pages used by applications into memory. The pages are typically stored on a rotating non-volatile media such as a magnetic hard disk (e.g., a hard drive). However, the device's processor executes instructions only from addressable memory such as DRAM or some other type of volatile electronic memory. The operating systems used in the computing devices cache the pages used by applications in memory so that the applications do not need to load pages from the rotating media as frequently.

The transfer of the pages from the hard drive is slow, particularly when the application is loading a large file. This is also prevalent in restoring the computer system from hibernate mode. A significant factor in the transfer time is due to the disk drive spin up speed. A relatively small disk spinning at a relatively slow RPM requires 5 to 6 seconds to spin up and be usable. Larger disks such as multi-platter devices and those spinning at faster RPMs require 10 to 12 seconds or more to spin up.

This problem gets worse as applications grow in size to incorporate security fixes and become more reliable. These applications often require more memory to operate without having continually transfer data to and from the rotating storage media. However, upgrading the memory of machines is often too costly to undertake for corporations and end users or is beyond the skill level of individual users. Although the cost of memory itself is low, the labor and downtime involved in physically opening each machine and adding RAM may cost several hundred dollars.

Another problem where upgrading the memory of machines is often too costly to undertake is when a system is required to occasionally execute larger and more complex applications than normal. For example, an accounting staff of a company might need to run consolidation applications a few times a month. The larger and more complex applications require more memory to operate efficiently. Although the cost of memory itself is low, the labor and downtime involved in physically opening each machine and adding RAM may cost several hundred dollars. This cost may not justify the additional memory for the few times the application is run.

BRIEF SUMMARY OF THE INVENTION

The invention is directed towards an improved memory management architecture that provides a system, method, and mechanism that utilizes external memory (volatile or non-volatile) devices to cache sectors from the hard disk (i.e., disk sectors) and/or slower memory components to improve system performance. When an external memory device (EMD) is plugged into the computing device or onto a network in which the computing device is connected, the system recognizes the EMD and populates the EMD with disk sectors and/or memory sectors. The system routes I/O read requests directed to the sector to the EMD cache instead of the actual sector. If the EMD is connected to the USB2 local bus, the access time can be twenty times faster that reading from the hard disk. The use of EMDS increases performance and productivity on the computing device systems for a fraction of the cost of adding memory to the computing device. Additionally, consumer devices such as Xbox® can run richer software with the memory of EMDs.

The system detects when an EMD is first used with respect to the computing device. The type of EMD is detected and a driver is installed that is used to cache disk sectors on the EMD. The driver uses the EMD as an asynchronous cache, caching sectors from any disk and/or slower memory device on the system. If no prior knowledge of which sectors are valuable in terms of frequent access, the system may use data on the computing machine to determine which sectors are used to populate the EMD cache. Alternatively, the system populates the EMD cache with a particular sector when that particular sector is accessed during operation. The next time that particular sector is to be accessed for a read operation, the system directs the read operation to access the copy from the EMD.

The system may track usage patterns and determine which disk sectors are most frequently accessed. On subsequent uses of the EMD, the system caches those sectors that are most frequently accessed onto the EMD. If the EMD is present when the computing device is powered up, the EMD can be pre-populated with data during start-up of the operating system.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
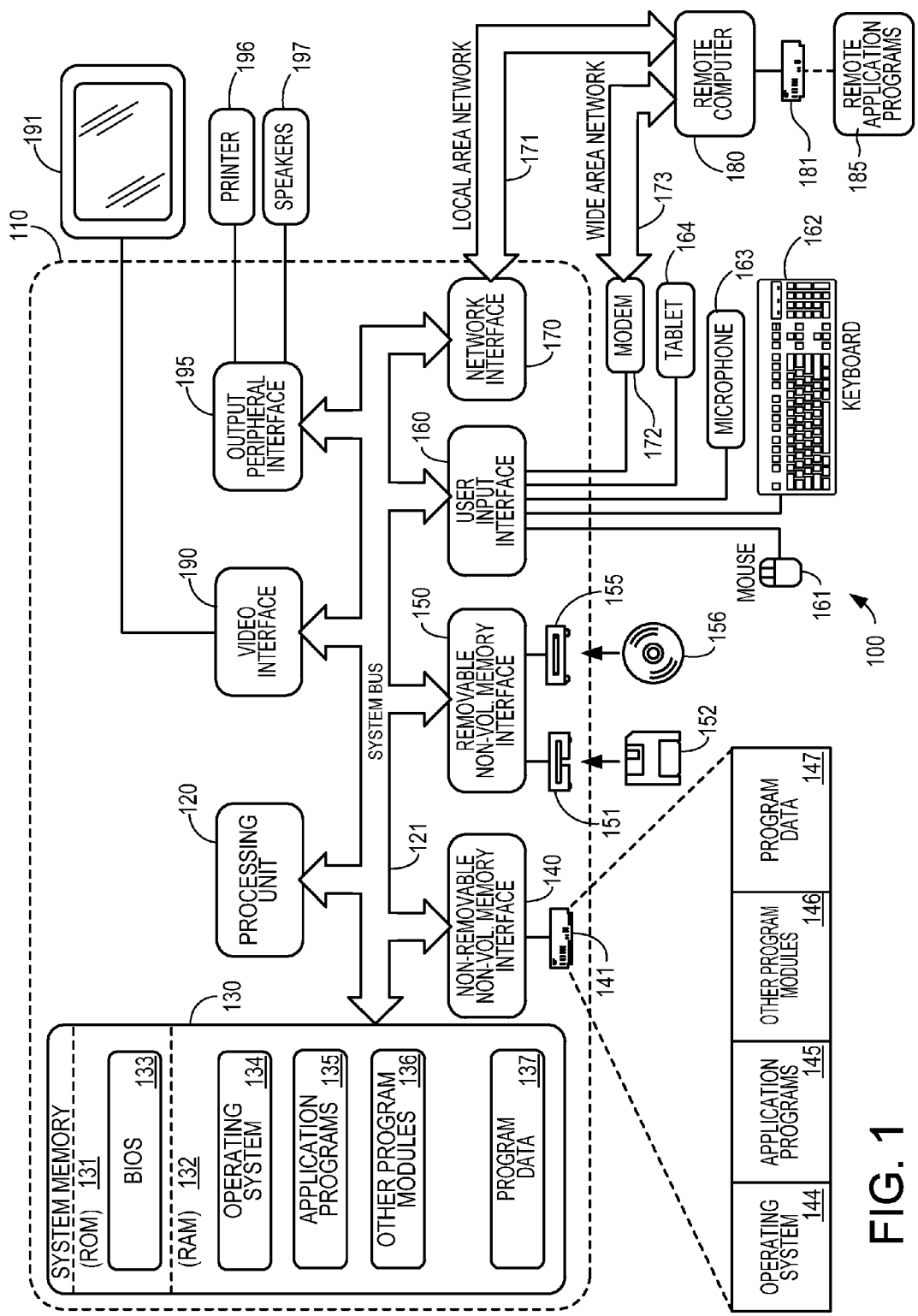
FIG. 1 is a block diagram generally illustrating an exemplary computer system on which the present invention resides.

The invention is directed towards an improved memory management architecture that provides a system, method, and mechanism that utilizes external memory (volatile or non-volatile) devices to cache sectors from the hard disk (i.e., disk sectors) or from slower memory devices to improve system performance. For example, many classes of portable computing devices have no hard drives or rotating media storage devices, but still implement hierarchical memory architectures. These portable computing devices would benefit greatly from this invention in that it would allow them to execute larger and more complex enterprise applications within the office place. With the advent of 802.11n, 200-500 Mb wireless connectivity will be available to any wireless device and the use of external memory devices and/or network based memory servers will improve system performance.

The external memory is used to cache data from devices that are generally slower in terms of accessing data such that access times for data used by applications/operating systems can be accessed quicker, thereby improving performance. For older computing devices in which adding actual RAM is too costly, the use of external memory devices will increase performance and productivity on the older devices for a fraction of the cost and enable users to reap the reliability, security, and productivity improvements of newer software applications on existing hardware. For example, consumer devices such as Xbox® benefit by running richer software in terms of improved graphics and performance. Additionally, the amount of memory required for this purpose is likely much less than the amount of memory required to update a system up to a given level.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, game consoles, smart phones, personal data assistants, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Universal Serial Bus (USB), and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term "computer storage media" as used herein refers to an article of manufacture that is not a signal or carrier wave per se. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data (e.g., multimedia data, audio data, video data, etc.) for the computer 110. In FIG. 1, for example, hard disk drive) 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162, a pointing device 161, commonly referred to as a mouse, trackball or touch pad, a microphone 163, and a tablet or electronic digitizer 164. Other input devices not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
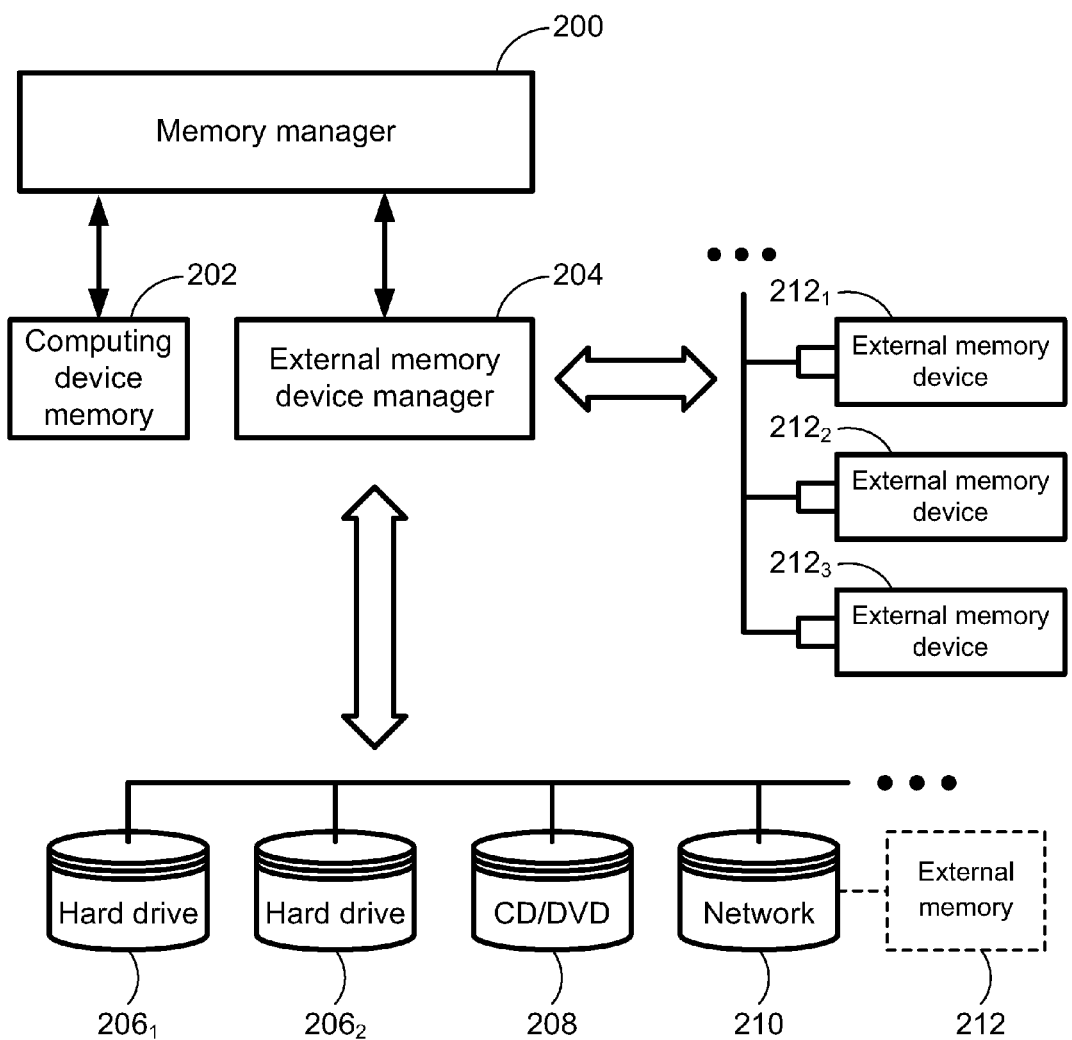
FIG. 2 is a block diagram representing a memory management architecture in accordance with an aspect of the invention.

Turning now to FIG. 2, the present invention provides a memory manager 200 controlling conventional device memory 202 and is in communication with external memory device (EMD) manager 204. The EMD manager 204 is under the memory manager 200 and above the physical hardware $206_1$, $206_2$, 208 and network 210. The physical hardware may be a hard drive, a multimedia drive such as a CD drive, a DVD drive, or a combination CD/DVD drive, an optical disk, etc. located locally or remotely accessible via the network. While EMD manager 204 is shown separately, it is recognized that the EMD manager 204 may be integrated with memory manager 200. EMD manager 204 detects when an external memory device (EMD) 212 is accessible via conventional methods such as plug-n-play and the like. The EMD 212 may be in the form of a removable solid state non-volatile memory device which can be plugged into the computing device, such as one according to the CompactFlash specification as maintained by the CompactFlash Association, or the like. It may also be in the form of a volatile memory device. The EMD can in fact be housed within existing externally attached products, such as a mouse, a keyboard, or a network attached device and there can be multiple such devices attached at a time. Another alternative location of the external memory device is at a remote location on network 210 or part of the network infrastructure such as memory on a server.

The present invention leverages the memory available for use in the EMD to maintain in memory the disk sectors that are likely to be used by applications and directs I/O requests that are directed to data that is in disk sectors copied into the EMD memory to be read from the EMD memory instead of the sector on disk.

Figure 3A:
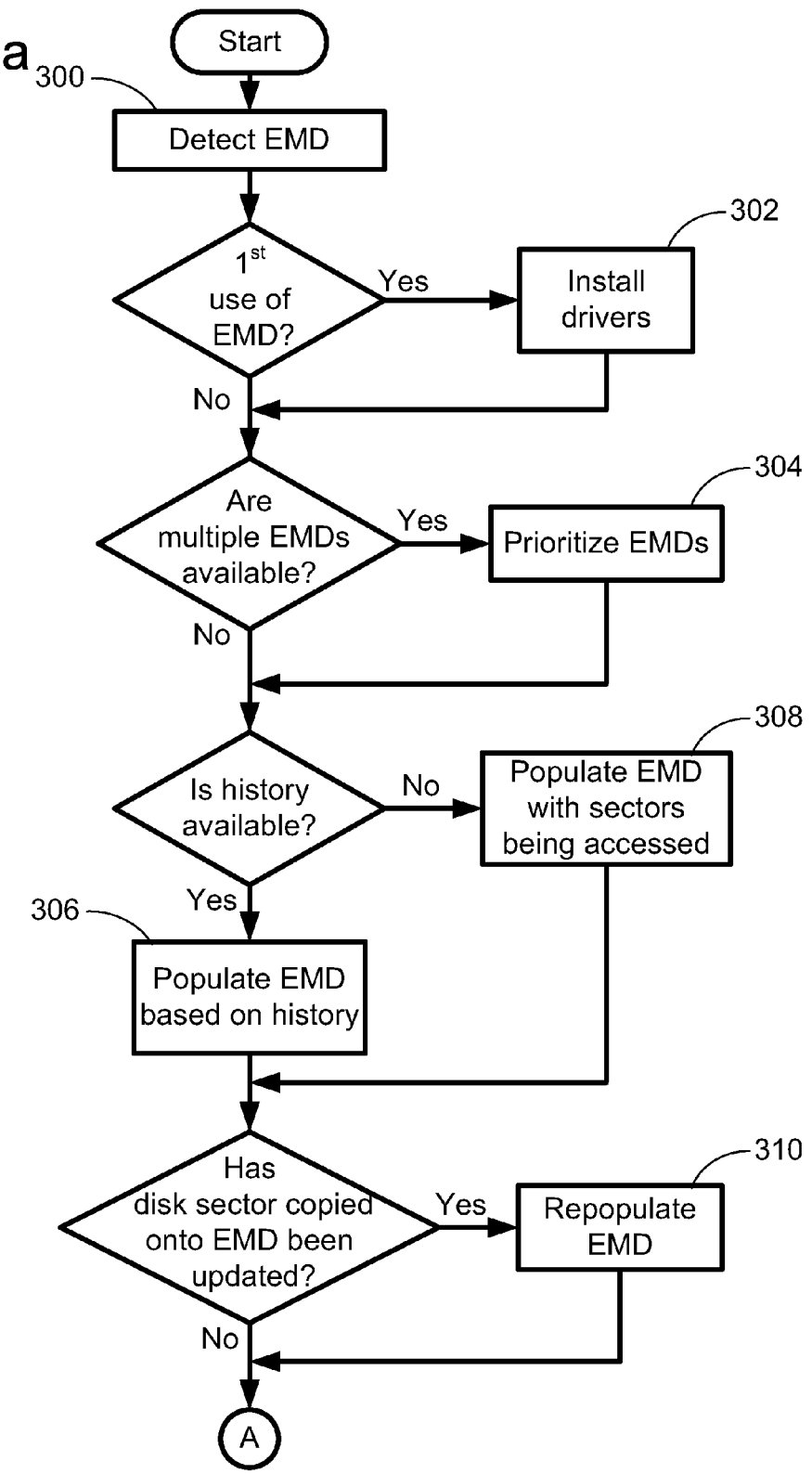
FIGS. 3a-3b are a flow chart generally illustrating the steps the invention takes in utilizing external memory devices to improve system performance.
Figure 3B:
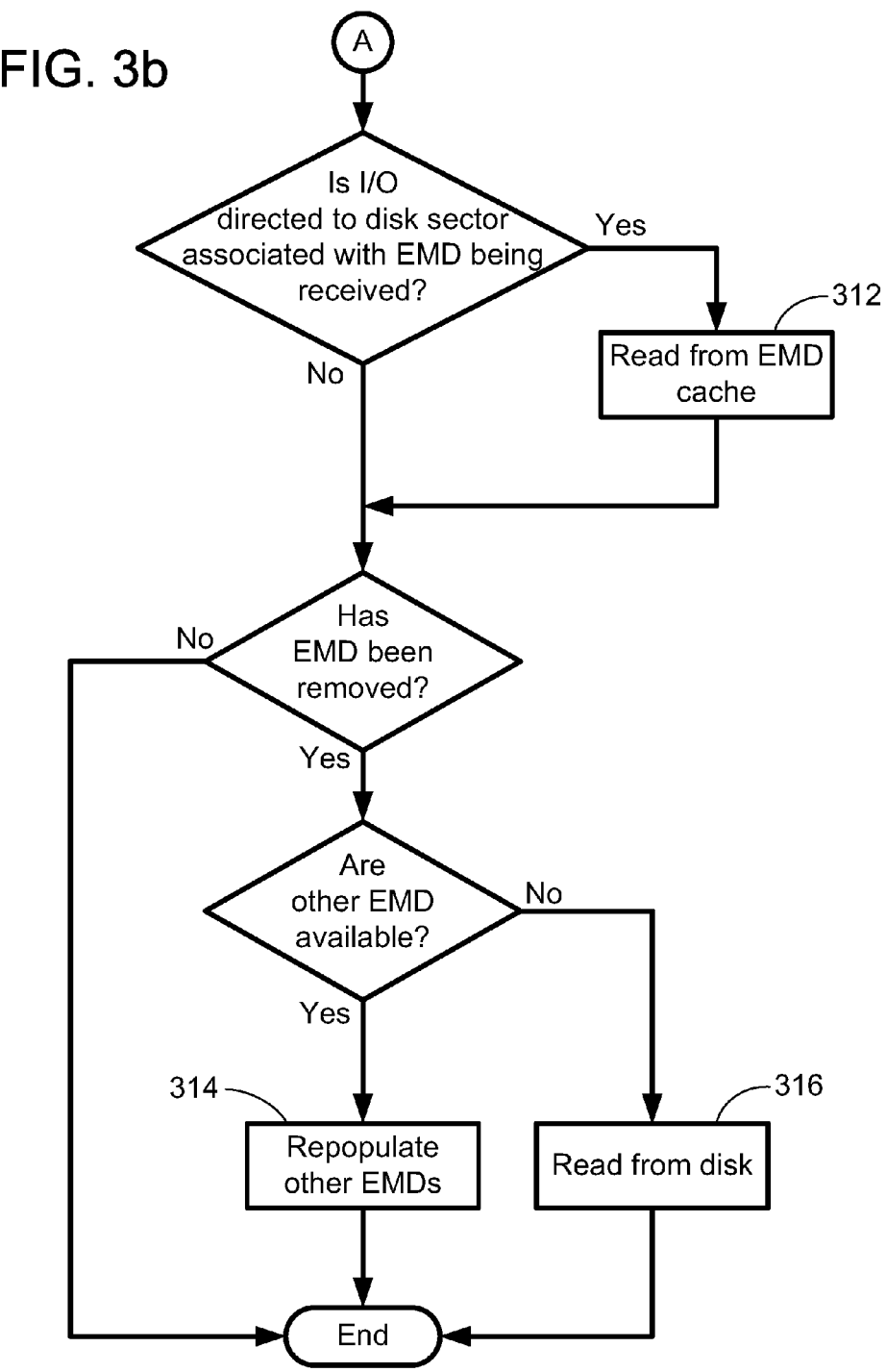

With reference to FIGS. 3a and 3b, the steps the invention performs to utilize external memory devices shall now be described. In the description that follows, the sectors used to describe the invention will reside on a hard drive 206. While the invention is being described in the foregoing context, if it not meant to be limiting as those of skill in the art will appreciate that disk sectors from other devices that require spin-up such as CD/DVD device 208 and the like may be cached on disk. The sectors that are cached may also reside on slower memory devices. While FIGS. 3a and 3b show steps serially, it should be understood that the steps may be taken in different order and/or in parallel. EMD manager 204 detects when an EMD 212 is available (step 300). One approach to detect an EMD is the detection interface described in U.S. patent application Ser. No. 10/837,986, filed May 3, 2004, entitled "Non-Volatile Memory Cache Performance Improvement", hereby incorporated by reference in its entirety. Other methods may be used such as conventional plug and play methods. The size and type of memory available in the EMD 212 is determined. If the EMD 212 is being used for the first time in the computing device, a driver for the EMD 212 is installed (step 302). The driver is used to communicate with the EMD 212 and uses the EMD as an asynchronous block cache to cache sectors disks 206 on the system. The updating of the cache is asynchronous in the event that the EMD may be slow and waiting for it to be updated can result in increased latency for the original read request.

If other EMDs are available for use, the system prioritizes how the EMDS will be populated by caching disk sectors that are more likely to be used on EMDs that have better bandwidth and latency in comparison to other available EMDs (step 304). Some computing devices keep track of disk usage such as which disk sectors are most frequently accessed by the operating system and by applications, last access times, access patterns, access frequency, and the like. If this history is available, the EMD is populated based on the history (step 306). If the history is not available, the EMD is populated with the disk sectors being accessed by the applications (or computing device) during the time the application is reading from disk (step 308). Note that the EMD may be populated in the format required by the EMD. The usage information (i.e., history) of disk sectors is tracked to determine which sectors should be mirrored onto the EMD the next time the EMD is available for use. The algorithms used are similar to the algorithms used to proactively manage page memory as described in U.S. patent application Ser. No. 10/325,591, filed Dec. 20, 2002, entitled "Methods and Mechanisms for Proactive Memory Management," which is hereby incorporated by reference in its entirety. The difference is that instead of determining which pages in memory are useful to cache, the present invention determines which disk sectors a useful to cache.

In one embodiment wherein the computing device is in a networked system, a network server retains information about the computing device and employs remote algorithms that assist the EMD manager 204 in the management of local memory for the computing device. This embodiment is particularly suitable for low-end clients that don't have the memory or computer power to determine which disk sectors should be cached. The remote algorithms perform a detailed analysis on data patterns, access patterns, etc. on the client and produce more optimum results than the low-end client could produce.

During operation, an application or the computing device may write to a disk sector that is copied to an EMD. The EMD is never written to by the application or computing device. Instead, the write to operation applied to the disk sector. After the write operation is completed, the disk sector is copied back onto the EMD (step 310). This approach is used so that if the EMD is removed, no data is lost such as would be the case in a remote file system when the link to the remote file system is not operable; instead, the computing device reads from disk instead of the EMD. As a result, the invention is more resistant to connectivity issues such as lost connections, removal of EMDs, etc.

Whenever an I/O read request is received, EMD manager 204 checks to see if the request is directed to a disk sector that has been copied to the memory of an EMD 212. If the read request is directed to a disk sector that has been copied to the memory of an EMD, the EMD manager 204 redirects the read request to the EMD (step 312). The result is that the read request is completed faster than if the read request was completed at the hard disk 206.

An EMD 212 can be removed by a user at any time. When an EMD is removed, the system detects the removal. If other EMDs are available, the remaining EMDs are repopulated (step 314) if the EMD that was removed was not the slowest EMD available. If other EMDs are not available (or if the EMD that was removed was the slowest EMD)), data is read from the hard disk (step 316). Steps 300 to 316 are repeated whenever an EMD is added or removed and steps 310 and 312 are repeated for as long as an EMD is available for use.

Note that if the EMD is non-volatile, the EMD memory can be pre-populated with sectors having configuration data during power down or when hibernating. During power-up or restoration, the contents of the EMD can be read while the disk is spinning up. The use of this technique can decrease the boot time and the hibernate awaken time of a computer system. Further details can be found in U.S. patent application Ser. No. 10/186,164, filed Jun. 27, 2002, entitled "Apparatus and Method to Decrease Boot Time and Hibernate Awaken Time of a Computer System," hereby incorporated by reference in its entirety.

Now that the overall steps have been described, the performance improvements shall be discussed. The key factors that determine the performance improvements that can be expected from external memory devices are the transfer latency and throughput for the EMD and its bus USB½, PCMCIA, Ethernet 100BaseT, etc.), the size of the external memory, the policies used in managing the cache, and the scenarios and workloads of how the external memory is used.

The transfer latency and throughput for the most typical busses EMD may be plugged in varies. It is expected that the bus becomes the primary bottleneck for most operations if the EMD consists of regular RAM packaged as a device that can be plugged into the particular bus. The bus latency and throughput for USB1, USB2 and PCI/PCMCIA is estimated by issuing unbuffered disk I/Os of increasing sizes (4 KB, 8 KB, 16 KB, 32 KB and 64 KB) that should hit the track buffer (which is typically regular memory) of the disk plugged into that bus. The following values of Table 1 were derived by simply fitting a line to the times it took to transfer the I/O sizes.

TABLE 1

| Bus Type | Setup Time (us) | Time to Transfer each KB after Setup (us) | Total Time to Transfer 4 KB (us) |
|---|---|---|---|
| PCI/PCMCIA (Cardbus) | 100 | 15 | 160 |
| USB 2 | 400 | 30 | 520 |
| USB 1 | 4000 | 1000 | 8000 |

In order to be meaningful as a disk cache, copying data from the EMD must be faster than going to the disk for it. A 4 KB random disk I/O that involves a seek takes anywhere from 5-15 ms on typical desktop and laptop disks. Assume that it takes 10 ms for a 4 KB disk I/O with seek, data could have been retrieved 60× faster from an EMD cache on PCMCIA, or 20× faster from an EMD on USB2. Overall, USB2 seems to be a very suitable bus for plugging in EMDs.

It should be noted that one issue with USB1 is that the 4 ms setup times would make any performance gains unlikely. This can be worked around by always keeping an isochronous transfer channel open. Obtaining 4 KBs from an EMD on USB 1 would then be typically twice as fast then obtaining it from a disk with a seek. Due to the low throughput rate over USB 1, it would still be faster to go to the disk for 16 KB, 32 KB and 64 KB I/Os that are typically seen on client systems. However, a USB 1 cache used only for the pagefile and file system metadata which is typically accessed with 4 KB random I/Os can still deliver a performance boost.

USB 2 adoption started only after service pack 1 of Windows XP® was released. Most of the 64 MB and 128 MB systems that would benefit most from EMD will not typically have USB 2. However, these systems usually do have a 100BaseT Ethernet network cards. Transfer times of 10 MB/s would be sufficient for significant performance gains from an EMD. An EMD could be attached as a pass through network device per computer, or could even be pushed into the network switches to improve the performance of a small network of computers. Going beyond the switch introduces many reliability and security issues due to shared network bandwidth, but could be done.

As with any cache, the actual policies used in managing which data to keep in the cache is a big factor in determining the resulting performance gains. If an EMD is used as a block cache for underlying disks and other devices, the EMD cache can be populated when reads from the underlying device completes, as well as when writes are issued from applications and file systems. As previously described, the data in the EMD cache will need to be updated asynchronously in order to avoid increasing the time of the original device requests. If a request comes for a range that is being asynchronously updated, it can simply be passed down to the underlying device. If the asynchronous update is outstanding, there must have been a very recent request for the same range that initiated the update, and the data for the range is likely to be cached at the device (e.g. track buffer) or controller.

Typically block caches are managed with an LRU algorithm. In the algorithm, the referenced blocks are put to the end of the LRU list whenever a read request hits or misses the cache. When a block that is not in the cache is read or written to, blocks from the front of the LRU list are repurposed to cache the contents of the new blocks. As a result, LRU algorithms are prone to erosion because valuable blocks in the cache are churned through over time. Algorithms such as those that break the list to multiple prioritized sub-lists and maintain richer use history beyond the last access time will be more resilient.

On Windows NT, caching of file and page data is done by the memory manager via a standby page list. File systems, registry and other system components use the file object/mapping mechanisms cache their data at the same level through the memory and cache manager. If another cache is put at any other level, it results in double caching of the data. This holds true for EMD caches as well. In order to avoid this, the memory manager of the present invention can be extended to push less valuable standby list pages to the slower external memory devices. Whenever those pages are accessed, the memory manager can allocate physical memory pages and copy the data back from the external memory device. The EMD memory manager and an associated cache manager can use page priority hints that U.S. patent application Ser. No. 10/325,591 provides for a proactive and resilient management of the unified cache of pages. Since this will require kernel memory manager changes, any EMD solutions built for Windows XP are likely to suffer from double caching of the data. Simulations show that in spite of the double caching, substantial performance gains are still possible.

Another important parameter for caching is the block size and the amount of clustering and read-ahead. Whenever there is a miss in the cache, even if a smaller amount of data is requested, one needs to read at least a block size of data from the underlying disk or device and possibly even cluster more blocks around the requested offset. Clustering may eliminate future seeks back to the same position on the disk. However, it may also increase the completion time of the original request and even cause more churn in the LRU list as more blocks are referenced for each request. Further, read ahead may be queued to get even more consecutive data from the disk while it is efficient to do so, without impacting the time for the original request. However, this may result in increasing the latency for a subsequent request that needs to seek to somewhere else on the device.

It should be noted that the list of device locations that are deemed valuable by the cache can be persisted across power transitions such as boot or even periods of intense use that purge the regular contents of the cache. This list can be used to repopulate the cache contents after such a transition with proper prioritization support for background I/O.

As with any performance analysis, it is crucial to look at representative scenarios and workloads to getting meaningful and useful data. In order to characterize the performance improvements that can be expected from EMD caches on existing Windows (XP & 2000), experiments with simple LRU write-through block caching at the disk level were performed. As discussed above, this will suffer from double caching of the data. However, these experiments are easier to emulate, simulate and actually build such EMD caches and measure their impact. Results show that even such a simple cache can have a big impact on disk and system performance. Integration with the computing device's memory manager and using a smarter policy would further increase the gains.

Since the experiment basically caches for the disk accesses, the success of the cache can be measured by comparing the overall time for the playback of the same set of disk accesses that are captured from a representative workload or scenario, without the cache and with various configurations of the cache. In most client scenarios, reductions in disk read times result in a proportional increase in responsiveness or benchmark scores.

In order to determine the real world impact of an EMD cache, two scenarios were looked at. One used disk traces captured from real end-user systems over hours on 128 MB and 256 MB systems. Another used disk traces from industry benchmarks such as Business Winstone 2001, Content Creation Winstone 2002, and a modified version of Business Winstone that uses Office 2003 applications. Traces were obtained at multiple memory sizes, so the gains could be compared from a simple EMD cache to actually increasing the system memory size.

EMD devices can be accurately emulated by using a regular block cache and adding a delay to cache hits based on the desired EMD bus. After copying the requested bytes from memory, one can determine the transfer time that is calculated for the desired EMD bus based on the setup time and throughput values such as the ones in Table 1.

The procedure for this evaluation is to: configure the target system to run at the target memory size with/maxmem boot.ini switch; run the typical use scenario or an industry benchmark and trace the generated disk I/Os; configure the block cache with the desired parameters for the cache size and throughput/latency for the EMD device; replay the traced disk I/Os and capture the resulting disk I/Os due to cache issues; and compare the times and disk accesses for the two runs.

Ideally the scenarios should be run with the appropriately configured block cache and the end results (response times or benchmark scores) compared. However, if the link between disk times and the end results is already established, simply playing back the captured disk I/Os consume less time for the numerous EMD configurations that need to be evaluated. A simple simulator was used to roughly estimate the potential gains from an EMD cache. This allowed the processing of hours-tong disk traces from 128 MB customer systems as well as from internal development systems and measure the impact of various configurations of EMD caches. In order to simplify things further, we focused on the time it took the disk to process the reads and ignored the disk write times. Representative seek times were determined by ignoring seek times smaller than 2 ms and larger than 20 ms. The last couple positions of the disk head were tracked to simulate "track buffering." In spite of the complications above, the disk simulation is typically within an acceptable range: 75% of the predictions are within 15% of the actual times. Any misprediction is typically due to the conservative simulation and prediction of higher disk read times. Even though the disk simulator may not always accurately capture the performance characteristics of a disk in a specific trace, its own performance characteristics are representative and typical of an actual desktop/laptop disk.

Table 2 shows the reduction in disk read times in EMD cache simulation of disk traces that were acquired during actual use of various computing systems over hours of operation.

TABLE 2

Gains from EMD cache for actual end-user use of systems

| System | Simulated Disk Read Time (sec). | Simulated Disk Read Time % with a USB2 EMD Cache of Size | | | | | |
|---|---|---|---|---|---|---|---|
| | | 0 MB | 32 MB | 64 MB | 128 MB | 256 MB | 512 MB |
| System 1 (128 MB) | 1259 | 100% | 89% | 70% | 37% | 18% | 18% |
| System 2 (128 MB) | 1011 | 100% | 90% | 70% | 38% | 22% | 22% |
| System 3 (128 MB) | 2158 | 100% | 88% | 72% | 44% | 25% | 20% |
| System 4 (128 MB) | 866 | 100% | 90% | 80% | 63% | 48% | 37% |
| System 5 (256 MB) | 1747 | 100% | 92% | 85% | 70% | 52% | 40% |
| System 6 (256 MB) | 2187 | 100% | 94% | 87% | 76% | 66% | 57% |

As an example of how to interpret data from Table 2, consider system 1: a 128 MB USB2 EMD device will result in 37% of the disk read time that the current user is experiencing (i.e., a 63% reduction).

Systems 1 and 2 are from a corporation that wanted to upgrade to Windows XP, Office 2003 and latest SMS on their 128 MB systems, but hit significant slowdowns when running their line of business software. The system 3 trace is from a laptop. It can be seen that the largest improvements in these systems are systems with slower disks and only 128 MB of memory.

The bottom three systems (systems 4, 5, and 6) are developer systems on which heavy weight development tasks including building, syncing & processing of large files were performed. These systems have faster disks and the most disk I/Os generated by these tasks are sequential and do not benefit from a LRU block cache as much because they do not re-access the same sectors on the disk many times (e.g. syncing). Thus the overall disk time is not as representative of the end user responsiveness. The cache may have reduced the time for UI blocking disk reads significantly.

Table 3 shows the reduction in disk read times in EMD cache simulation of disk traces that were acquired during Content Creation Winstone 2002.

TABLE 3

Gains from EMD cache for Content Creation Winstone 2002

| System | Simulated Disk Read Time (s) | Simulated Disk Read Time % with a USB2 EMD Cache of Size | | | | |
|---|---|---|---|---|---|---|
| | | 0 MB | 32 MB | 64 MB | 128 MB | 256 MB | 512 MB |
| Laptop150(128 MB) | 241 | 100% | 88% | 76% | 62% | 46% | 39% |
| Laptop154(128 MB) | 172 | 100% | 89% | 76% | 63% | 46% | 40% |
| Desktop100(128 MB) | 173 | 100% | 90% | 78% | 65% | 46% | 40% |
| Desktop949(128 MB) | 142 | 100% | 89% | 79% | 67% | 48% | 42% |
| Laptop150(256 MB) | 64 | 100% | 93% | 86% | 72% | 55% | 54% |
| Laptop154(256 MB) | 55 | 100% | 90% | 84% | 70% | 56% | 56% |
| Desktop100(256 MB) | 47 | 100% | 95% | 87% | 76% | 60% | 59% |
| Desktop949(256 MB) | 34 | 100% | 94% | 88% | 80% | 70% | 70% |

Table 4 shows the reduction in disk read times in EMD cache simulation of disk traces that were acquired during Business Winstone 2001.

TABLE 4

Gains from EMD cache for Business Winstone 2001

| System | Simulated Disk Read Time (s) | Simulated Disk Read Time % with a USB2 EMD Cache of Size | | | | |
|---|---|---|---|---|---|---|
| | | 0 MB | 32 MB | 64 MB | 128 MB | 256 MB | 512 MB |
| Laptop150 (128 MB) | 176 | 100% | 84% | 75% | 60% | 41% | 37% |
| Laptop159(128 MB) | 226 | 100% | 88% | 76% | 60% | 42% | 37% |
| Desktop094(128 MB) | 90 | 100% | 90% | 83% | 71% | 54% | 52% |
| Desktop211(128 MB) | 83 | 100% | 91% | 84% | 72% | 59% | 57% |
| Laptop150 (256 MB) | 93 | 100% | 82% | 79% | 67% | 56% | 55% |
| Laptop159(256 MB) | 76 | 100% | 87% | 86% | 76% | 69% | 69% |
| Desktop211(256 MB) | 40 | 100% | 94% | 92% | 85% | 79% | 78% |
| Desktop094(256 MB) | 40 | 100% | 95% | 93% | 85% | 80% | 79% |

As in previous cases, the improvements seen on systems with 128 MB and slower disks are the largest. Business Winstone 2001 starts to mostly fit in memory in 256 MBs, so the overall disk times and the gains from EMD are smaller in this system memory size.

Table 5 compares the gains from adding EMD cache to a system to actually adding more physical memory when running Content Creation Winstone 2002. As previously noted, the EMD cache simulation suffers from double caching of the data and is managed with a simple LRU policy. Typically adding more physical memory to the system will deliver better performance in a bigger number of scenarios. On the other hand, if the EMD cache can be integrated with the memory manager and managed with the same advanced algorithms that U.S. patent application Ser. No. 10/325,591 can provide, it can deliver performance gains comparable to adding actual memory to the system.

TABLE 5

Comparison of gains from USB2 EMD cache and actual increase in system memory

| System & Memory Size | Simulated Disk Read Time (s) with USB2 EMD Cache of Size | | | | | |
|---|---|---|---|---|---|---|
| | 0 MB | 32 MB | 64 MB | 128 MB | 256 MB | 512 MB |
| Laptop150(128 MB) | 266 | 212 | 184 | 149 | 110 | 93 |
| Laptop150(256 MB) | 76 | 60 | 56 | 46 | 35 | 35 |
| Laptop150(512 MB) | 27 | 24 | 23 | 21 | 21 | 20 |

From the foregoing, it can be seen that a system and method to improve performance of a computing device using external memory has been described. The invention allows legacy computing devices and other devices with low amounts of memory to effectively upgrade the memory without having to physically open the device. Productivity gains terms of faster and more reliable performance can be achieved using the external memory. Sectors from rotating storage media and slower memory devices are asynchronously cached in the external memory. Unlike remote file systems, data is not lost if the external memory is removed as the data is still on the rotating storage media or slower memory devices.

All of the references cited herein, including patents, patent applications, and publications, are hereby incorporated in their entireties by reference. The use of the terms "a" and "an" and "the" and similar referents in the context of describing the invention especially in the context of the following claims to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. For example, the Windows® operating system was referenced to describe the invention. Those skilled in the art will recognize that the invention may be implemented on other operating systems such as Linux, SunOs, and the like. No language in the specification should be construed as indicating any non-claimed element as essential to the practice of the invention.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computing device comprising:
   a storage device; and
   a processor coupled to the storage device and via which the computing device is configured to:
      determine, based on a read request for data where the read request is directed to the storage device, that the data is available from a removable memory device that is accessible to the computing device and that is configured to complete the read request faster than the storage device; and
      redirect, based on the computing device determining that the removable memory device is configured to complete the read request faster than the storage device, the read request from the storage device to the removable memory device.

2. The computing device of claim 1 where, prior to the read request, the data was cached on the removable memory device.

3. The computing device of claim 1 where, prior to the read request, the data was cached on the removable memory device based on an access pattern or based on an access frequency.

4. The computing device of claim 1 further configured to detect multiple removable memory devices accessible to the computing device.

5. The computing device of claim 4 further configured to prioritize the multiple removable memory devices.

6. The computing device of claim 5 where the multiple removable memory devices are prioritized by the computing device according to their relative latencies.

7. The computing device of claim 5 where the multiple removable memory devices are prioritized by the computing device according to their relative bandwidths.

8. A method performed on a computing device that includes a storage device, the method comprising:
   determining, by the computing device based on a read request for data where the read request is directed to the storage device, that the data is available from a removable memory device that is accessible to the computing device and that is configured to complete the read request faster than the storage device; and
   redirecting, based on the determining, the read request from the storage device to the removable memory device.

9. The method of claim 8 where, prior to the read request, the data was cached on the removable memory device.

10. The method of claim 8 where, prior to the read request, the data was cached on the removable memory device based on an access pattern or based on an access frequency.

11. The method of claim 8 further comprising detecting, by the computing device, multiple removable memory devices accessible to the computing device.

12. The method of claim 11 further comprising prioritizing, by the computing device, the multiple removable memory devices.

13. The method of claim 12 where the multiple removable memory devices are prioritized according to their relative latencies.

14. The method of claim 12 where the multiple removable memory devices are prioritized according to their relative bandwidths.

15. At least one computer storage media that comprises computer-executable instructions that, based on execution by a processor of a computing device that includes a storage device, configure the computing device to perform actions comprising:
   determining, by the computing device based on a read request for data where the read request is directed to the storage device, that the data is available from a removable memory device that is accessible to the computing device and that is configured to complete the read request faster than the storage device; and
   redirecting, based on the determining, the read request from the storage device to the removable memory device.

16. The at least one computer storage media of claim 15 where, prior to the read request, the data was cached on the removable memory device based on an access frequency or based on an access pattern.

17. The at least one computer storage media of claim 15, the actions further comprising detecting multiple removable memory devices accessible to the computing device.

18. The at least one computer storage media of claim 17, the actions further comprising prioritizing the multiple removable memory devices.

19. The at least one computer storage media of claim 18 where the multiple removable memory devices are prioritized according to their relative latencies.

20. The at least one computer storage media of claim 18 where the multiple removable memory devices are prioritized according to their relative bandwidths.

* * * * *